US012428142B2

(12) United States Patent
Benner et al.

(10) Patent No.: US 12,428,142 B2
(45) Date of Patent: Sep. 30, 2025

(54) HELICOPTER ROTOR SYSTEM

(71) Applicant: Eagle Technologies, LLC, Newport News, VA (US)

(72) Inventors: John P. Benner, Williamsburg, VA (US); Michael D. Bartley, Newport News, VA (US); Cary A. Kravets, Norfolk, VA (US); Bruce E. Bailey, Williamsburg, VA (US)

(73) Assignee: Eagle Technologies, LLC, Newport News, VA (US)

( * ) Notice: Subject to any disclaimer, the term of this patent is extended or adjusted under 35 U.S.C. 154(b) by 0 days.

(21) Appl. No.: 18/753,030

(22) Filed: Jun. 25, 2024

(65) Prior Publication Data

US 2024/0343389 A1    Oct. 17, 2024

Related U.S. Application Data

(63) Continuation of application No. 18/295,329, filed on Apr. 4, 2023, now Pat. No. 12,017,762.

(60) Provisional application No. 63/383,933, filed on Nov. 16, 2022, provisional application No. 63/362,690, filed on Apr. 8, 2022.

(51) Int. Cl.
  *B64C 27/605* (2006.01)
  *B64C 27/10* (2023.01)
  *B64C 27/80* (2006.01)

(52) U.S. Cl.
  CPC ............ *B64C 27/605* (2013.01); *B64C 27/10* (2013.01); *B64C 27/80* (2013.01)

(58) Field of Classification Search
  CPC ........ B64C 27/605; B64C 27/10; B64C 27/80
  See application file for complete search history.

(56) References Cited

U.S. PATENT DOCUMENTS

| 4,216,925 | A | 8/1980 | Mendiberri |
| 11,524,776 | B2 * | 12/2022 | Marshall ................. B64C 27/80 |
| 11,738,864 | B2 * | 8/2023 | Chando ................. B64C 27/605 244/7 A |
| 12,017,762 | B2 | 6/2024 | Benner et al. |
| 2008/0111399 | A1 | 5/2008 | Zierten |
| 2009/0220341 | A1 | 9/2009 | Schmaling et al. |
| 2011/0150646 | A1 | 6/2011 | D'Anna |

(Continued)

OTHER PUBLICATIONS

International Search Report and Written Opinion dated Jun. 22, 2023 from corresponding PCT Application No. PCT/US2023/017368.

*Primary Examiner* — Valentina Xavier
(74) *Attorney, Agent, or Firm* — HONIGMAN LLP

(57) ABSTRACT

A coaxial rotor system includes a plurality of upper rotor blades and a plurality of lower rotor blades disposed at a mast assembly. The upper rotor blades rotate about an axis of rotation in a first direction and the lower rotor blades rotate about the axis of rotation in a second direction opposite the first direction. A control system disposed at the mast assembly between the upper and lower rotor blades includes an upper swashplate connected to the upper rotor blades and a lower swashplate connected to the lower rotor blades. The control system adjusts the upper swashplate and the lower swashplate relative to the mast assembly to adjust respective pitches of the upper and lower rotor blades relative to the axis of rotation. The control system is operable to adjust the upper swashplate and the lower swashplate relative to the mast assembly independently of one another.

34 Claims, 16 Drawing Sheets

(56) References Cited

U.S. PATENT DOCUMENTS

| | | |
|---|---|---|
| 2012/0156033 A1 | 6/2012 | Cowles |
| 2013/0156575 A1 | 6/2013 | Stamps |
| 2014/0299708 A1* | 10/2014 | Green ................... B64C 27/58 |
| | | 244/17.11 |
| 2017/0190415 A1* | 7/2017 | Sheridan ................ B64C 27/82 |
| 2019/0023382 A1 | 1/2019 | Welsh et al. |
| 2020/0017205 A1* | 1/2020 | Foskey ................ B64C 27/605 |

* cited by examiner

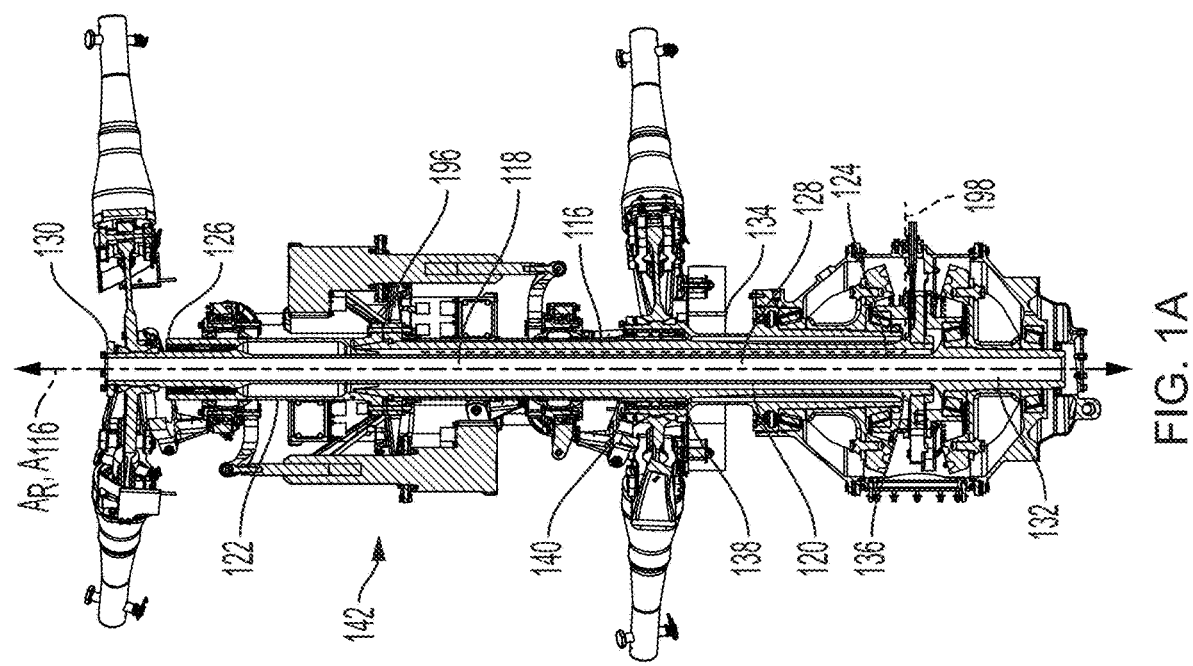

HELICOPTER ROTOR SYSTEM

CROSS REFERENCE TO RELATED APPLICATIONS

The present application is a continuation of U.S. patent application Ser. No. 18/295,329, filed Apr. 4, 2023, now U.S. Pat. No. 12,017,762, which claims the filing benefits of U.S. provisional application Ser. No. 63/383,933, filed Nov. 16, 2022, and U.S. provisional application Ser. No. 63/362,690, filed Apr. 8, 2022, which are hereby incorporated herein by reference in their entireties.

FIELD OF THE INVENTION

The present invention relates generally to the field of rotor systems for helicopters and more particularly, to control systems for coaxial rotor systems for helicopters.

BACKGROUND OF THE INVENTION

It is known to equip a helicopter with a rotor system for providing lift and maneuverability during operation of the helicopter. In particular, coaxial rotor systems drive first and second rotor blades in opposing directions so that the torsional force on the helicopter from one set of rotor blades is counteracted by the torsional force from the other set of rotor blades, resulting stability and yaw control of the helicopter without the need for a tail rotor as in single-rotor systems.

SUMMARY OF THE INVENTION

A coaxial rotor system for a helicopter may include a center mast non-rotatably disposed at a helicopter equipped with the coaxial rotor system. The center mast extends vertically from the helicopter, such as from a fuselage of the helicopter. An axis of rotation of the coaxial rotor system extends along a longitudinal axis of the center mast. An inner mast is disposed along an inner cavity of the center mast and is rotatable about the axis of rotation relative to the center mast in a first direction. An upper portion of the inner mast extends from an upper end of the center mast. An outer mast is disposed along an outer surface of the center mast and is rotatable about the axis of rotation relative to the center mast in a second direction that is opposite the first direction. The center mast extends from an upper end of the outer mast. An upper rotor blade assembly includes a plurality of upper rotor blades and is disposed at the upper portion of the inner mast. The upper rotor blade assembly is rotatable about the axis of rotation in the first direction via rotation of the inner mast. A lower rotor blade assembly includes a plurality of lower rotor blades and is disposed at the outer mast. The lower rotor blade assembly is rotatable about the axis of rotation in the second direction via rotation of the outer mast. A swashplate assembly is disposed along the center mast between the upper rotor blade assembly and the lower rotor blade assembly. The swashplate assembly includes (i) an upper swashplate connected to the upper rotor blade assembly, and (ii) a lower swashplate connected to the lower rotor blade assembly. An upper swashplate actuator is operable to adjust a position of the upper swashplate along the center mast and a pitch of the upper swashplate relative to the axis of rotation to adjust pitch of the plurality of upper rotor blades relative to the axis of rotation. A lower swashplate actuator is operable to adjust a position of the lower swashplate along the center mast and a pitch of the lower swashplate relative to the axis of rotation to adjust pitch of the plurality of lower rotor blades relative to the axis of rotation.

Thus, the center mast is non-rotatably disposed at the helicopter with the rotatable inner mast extending above the center mast for rotating the upper rotor blade assembly and the rotatable outer mast extending along a lower portion of the center mast for rotating the lower rotor blade assembly. The swashplate assembly is disposed along the non-rotatable center mast and includes the upper swashplate for adjusting pitch of the upper rotor blades and the lower swashplate for adjusting pitch of the lower rotor blades. The center mast provides a non-rotatable or fixed mounting position for non-rotating items at a position between the rotor blades, which allows, for example, for reduced complexity and weight of components mounted to the mast, reduced overall height of the rotor system, reduced swashplate bearing speeds, and independent control of the pitch of the upper and lower rotor blades. That is, a control system may be disposed at the center mast between the upper and lower rotor blade assemblies, with the control system operating to independently adjust pitch of a plurality of upper rotor blades and pitch of a plurality of lower rotor blades.

These and other objects, advantages, purposes and features of the present invention will become apparent upon review of the following specification in conjunction with the drawings.

BRIEF DESCRIPTION OF THE DRAWINGS

FIG. 1A is a cross-sectional view of the coaxial rotor system of FIG. 1;

DESCRIPTION OF THE PREFERRED EMBODIMENTS

Figure 1:
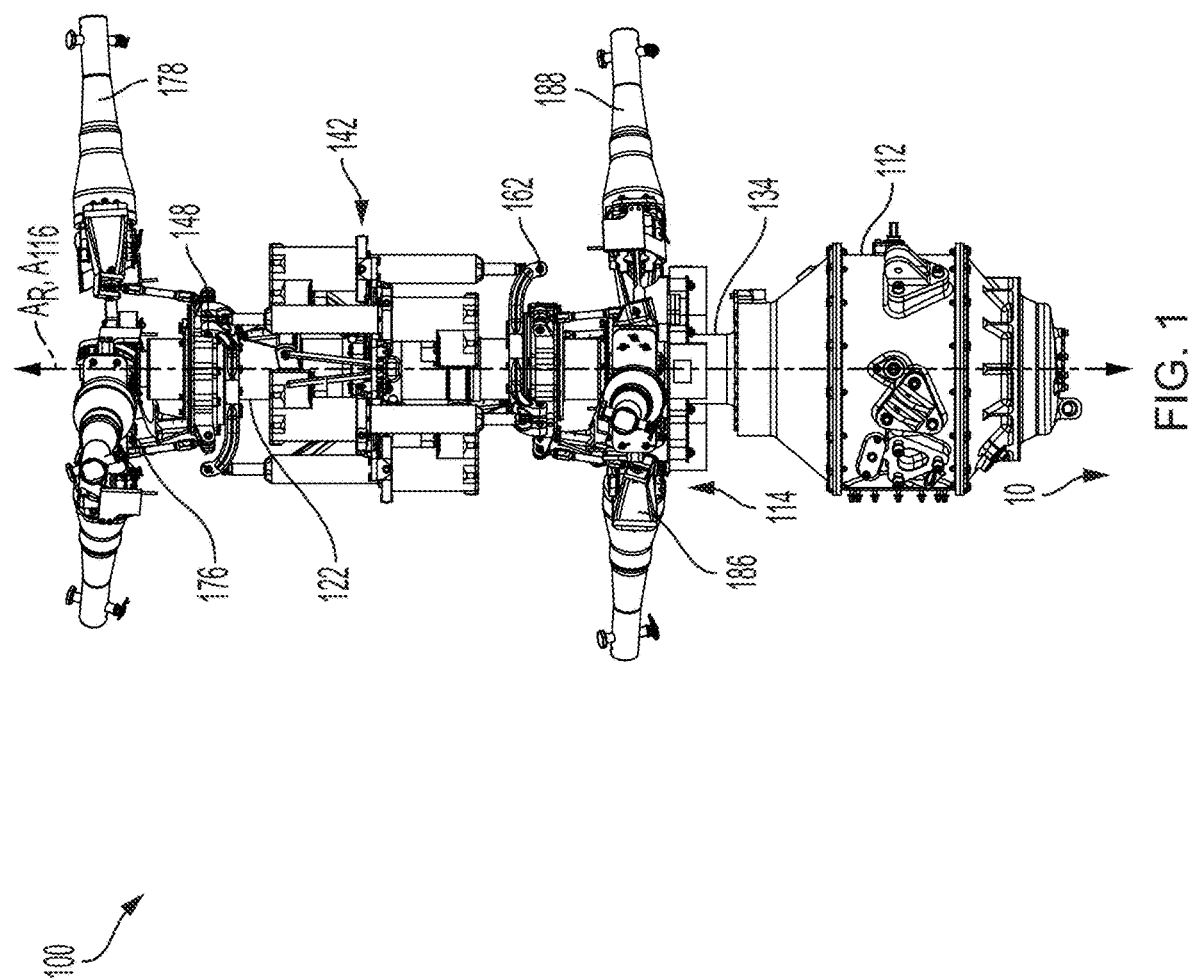
FIG. 1 is a perspective view of a coaxial rotor system for a helicopter where a control system for adjusting pitch of the upper and lower rotor blades is disposed between the upper and lower rotor blades along a stationary portion of a mast.

Coaxial rotor systems for helicopters include first and second sets of rotor blades that rotate in opposite directions relative to one another along a shared axis of rotation so that the torque on the helicopter created from rotation of one set of rotor blades is counteracted by the torque created from rotation of the other set of rotor blades. While rotation of the rotor blades creates lift for the helicopter, pitch of the coaxial rotor blades relative to one another controls yaw, pitch, and roll of the helicopter.

For example, a traditional coaxial rotor system includes an upper set of rotor blades and a lower set of rotor blades that are driven about a shared axis of rotation and thus are mounted to overlapping, counter-rotating masts. In other words, the traditional coaxial rotor system mounts one set of rotor blades to a mast that rotates in a first direction (e.g. clockwise) and mounts the other set of rotor blades to a second mast that rotates in a second direction opposite the first direction (e.g., counter clockwise) where one mast extends through the other. Control of the yaw, pitch, and roll of the helicopter is achieved through adjusting the pitch of the sets of rotor blades relative to one another.

Because traditional coaxial rotor systems mount the upper and lower rotor blades to counter-rotating and overlapping masts, systems for controlling the pitch of the rotor blades relative to one another typically must account for the rotations of the masts along the entire length of the masts, meaning that stationary actuators must be positioned below the rotor blades and the traditional systems are therefore limited to adjusting the pitches of the upper and lower rotor blades in tandem using complicated lever arrangements and counter-rotating swashplates. These lead to increased size and weight of the rotor systems, and reduced lifespans of the rotor systems. In comparison, the coaxial rotor system of the present disclosure provides a stationary and non-rotating mounting position between the upper and lower rotors so that a control system may be mounted between the upper and lower rotors and, among other advantages, pitch of the upper and lower rotor blades may be controlled independently from one another.

For example, a traditional coaxial rotor system may include lower rotor blades mounted to an outer mast that rotates in a first direction and upper rotor blades mounted to an inner mast that extends through and above the outer mast and rotates in a second direction opposite the first direction. Actuators for controlling the pitch of the upper and lower rotor blades are hydraulic and are located below the lower rotor as there is no non-rotating access to the space between the rotors. Thus, traditional coaxial rotor systems are limited to controlling the pitches of the upper and lower rotor blades relative to one another via a single set of actuators, meaning that pitches of the upper and lower rotor blades must be controlled in tandem.

Swashplates are typically located along the rotating masts for translating movement of the stationary actuators into adjustments of the pitch of the upper and lower rotor blades. For example, a lower swashplate may adjust position of the lower rotor blades and an upper swashplate may adjust position of the upper rotor blades. The lower swashplate may be located below the lower rotor blades and include a stationary portion that receives input from the stationary actuators and a rotatable portion that rotates with the lower rotor blades. Links reach from the rotatable portion of the lower swashplate to a lower rotatable portion of the upper swashplate so that adjustment of the lower swashplate may be translated to adjustment of the upper swashplate. The upper swashplate is located above the lower rotor blades along the mast and the lower rotatable portion of the upper swashplate rotates with the rotatable portion of the lower swashplate to accommodate the links reaching through the lower rotor blades. An upper portion of the upper swashplate rotates with the upper rotor blades and is linked to the upper rotor blades so that adjustment of the upper swashplate via adjustment of the lower swashplate may adjust the upper rotor blades. By virtue of this typical arrangement in existing rotorcraft, the relative speed of the upper portion of the upper swashplate relative to the lower portion (spinning with the lower rotor in the opposite direction) is equal to twice the nominal rotor speed. Additionally, differential collective levers are typically used to translate movement between the upper and lower swashplates. Historically, the means by which to accomplish this has been complex and problematic, requiring an entirely independent mechanical linkage and system of actuation. Having the swashplate actuators and the lower swashplate between a gearbox and lower rotor increases the height of the lower rotor mast, increasing the overall rotor system height (space taken up inside the fuselage).

Swashplate bearing life is dependent on many factors, including size, load, and speed. The swashplate must simultaneously transmit axial loads in either direction, side loads, and overturning moments. This requires either a duplex set of two angular contact bearings or a cross-contact bearing. As the swashplate bearings in traditional systems must be positioned around the mast and any gimbaling arrangements, the bearings tend to be fairly large in diameter and because of this size, speed limits become a concern. For example, at the bearing diameters typically used, a cross-contact bearing is not applicable due to speed limits on the bearing itself. Therefore, a back-to-back duplex set of two angular contact bearings is typically used. Furthermore, enhancing this concern on existing systems, the upper swashplate typically rotates at twice the rate of the rotor to account for the opposite rotation of the lower swashplate and thus the upper swashplate bearing accumulates cycles at twice the rate of the lower swashplate bearing.

Differential collective is the difference in the collective blade pitch setting between the upper and lower rotors. The different collective setting causes more or less drag on one set of rotors relative to the other, and therefore induces a yaw moment into the aircraft. Differential collective is traditionally applied through a complex lever arrangement located either above the upper rotors or between the upper and lower rotors with levers passing through holes in the mast. When the arrangement is above the upper rotors, this makes the overall rotor system taller, causing potential storage issues and creating additional drag. When the arrangement includes levers passing through holes in the mast, this causes higher stresses in the mast that must be accounted for by adding more material to the mast in that area and therefore increasing weight. The differential collective actuator may traditionally be located below the gearbox, which increases the overall height of the rotor system (space taken up inside the fuselage).

Phase lag, the angular difference between a point at which a control input to a rotor blade (e.g., adjustment of pitch) occurs and the point of maximum displacement of the blade in response to that control input, is very difficult to predict analytically or even through simulation. Typically, phase lag is estimated as closely as practical, tested during ground/flight testing, and adjusted or accounted for by manufacturing new mechanical connections between the actuators and sets of rotor blades, such as new swashplate rings and differential collective levers, such that the location of max blade pitch angle occurs at the correct azimuthal blade position. This leads to costly and time-intensive testing procedures and wasteful manufacturing of parts.

Furthermore, control system stiffness is important for responsiveness of the aircraft to pilot input, as well as avoiding instabilities in the linkages. In a traditional system, if the control system is too soft torsionally about the rotor, a condition can occur where a control load component tangential to the rotor rotation causes the control rods to tilt, increasing the tangential load, which further increases the tilt. This condition is unstable and results in loss of control of the blade pitch. Additionally, the low control system stiffness applies only to the upper rotor, causing a different control system stiffness of the upper rotor relative to the lower rotor. This causes an unintended differential control input that can cause aircraft controllability/predictability issues. In other words, because in a traditional rotor system, control of the pitch of the upper rotor blades relies upon connection to the lower swashplate and control of the pitch of the lower rotor blades, differences in stiffness between the connections of the upper and lower rotor blades and upper and lower swashplates can result in unintended differences in control of the upper and lower rotor blades.

The coaxial rotor system described further below includes a center or central mast non-rotatably disposed at the helicopter with an inner mast extending through an inner cavity of the center mast and above an upper end of the center mast to rotate an upper rotor blade assembly and an outer mast extending along an outer surface of the center mast to rotate a lower rotor blade assembly. A portion of the non-rotatable center mast is exposed between the upper rotor blade assembly and the lower rotor blade assembly and a control system is mounted along the stationary center mast. The control system includes upper and lower actuators for adjusting pitch of the upper and lower rotor blades and upper and lower swashplate assemblies for translating movement of the respective actuators to adjust the pitches of the upper and lower rotor blades. Thus, the coaxial rotor system provides upper and lower rotor blade assemblies that are adjustable independent of one another via upper and lower actuators coupled to respective upper and lower swashplate assemblies that pitch, translate, and rotate relative to the stationary center mast independent of one another.

Referring now to the drawings and the illustrative embodiments depicted therein, a coaxial rotor system 100 for a helicopter 10 includes a mast assembly 114 extending from a gearbox 112, with an upper rotor blade assembly 176 rotatably disposed at an upper portion of the mast assembly 114 and a lower rotor blade assembly 186 rotatably disposed at a lower portion of the mast assembly 114 (FIG. 1). The pitches of the respective upper rotor blade assembly 176 and the lower rotor blade assembly 186 are independently adjustable relative to one another to control the yaw, pitch, and roll of the helicopter 10. As discussed below, a central portion of the mast assembly 114 between the upper rotor blade assembly 176 and the lower rotor blade assembly 186 is fixed or stationary or non-rotatable so that a control system 142 for controlling the pitch of the upper and lower rotor blade assemblies may be mounted along the central portion of the mast assembly 114 between the upper and lower rotor blade assemblies.

Thus, the coaxial rotor system 100 provides a stationary mounting position along the mast assembly 114 between the upper and lower rotor blades for mounting the control system 142 that is operable to adjust the pitches of the upper and lower rotor blades. Mounting the control system 142 to a stationary position along the mast assembly 114 may allow for, among other advantages, the use of lighter control system components having longer life spans, independent control of the pitches of the upper and lower rotor blades, use of electromechanical actuators to adjust pitch of the upper and lower rotor blades, reduced overall height of the rotor system, and increased control system stiffness.

As shown in FIG. 1A, the mast assembly 114 includes a center or central mast 116, an inner mast 128, and an outer mast 134. An axis of rotation AR of the mast assembly 114 extends along a longitudinal axis $A_{116}$ of the center mast 116 and the center mast 116 is stationary or fixed or non-rotatable so that non-rotatable components may be mounted along the center mast 116. The inner mast 128 controls rotation of the upper rotor blade assembly 176 and rotates in a first direction about the axis of rotation AR to rotate the upper rotor blade assembly 176 in the first direction. The outer mast 134 controls rotation of the lower rotor blade assembly 186 and rotates in a second direction about the axis of rotation AR that is opposite the first direction to rotate the lower rotor blade assembly 186 in the second direction. The mast assembly 114 extends from the gearbox 112 of the helicopter 10 and the gearbox 112 controls the rotation of the inner and outer masts.

Thus, the center or central mast 116 is rotatably fixed relative to the gearbox 112 and extends from the helicopter 10 to define the axis of rotation AR of the coaxial rotor system 100. For example, the center mast 116 may be fixedly mounted to the helicopter 10 and/or the gearbox 112. The center mast 116 may extend substantially vertically from the helicopter 10, such as when the helicopter is not being operated and is positioned at a substantially horizontal ground surface, or at any suitable angle upward from the gearbox 112 and above the body of the helicopter 10.

The inner mast 128 is rotatably connected to the gearbox 112 and extends from the helicopter 10 along the axis of rotation AR and inboard of the center mast 116. For example, the inner mast 128 extends along an inner cavity 118 of the center mast 116 so that, when the inner mast 128 is rotated, the inner mast 128 rotates within the inner cavity 118 relative to the stationary center mast 116. Thus, the center mast 116 may circumscribe at least a portion of the inner mast 128.

The outer mast 134 is rotatably connected to the gearbox 112 separately from the inner mast 128 and extends from the helicopter 10 along the axis of rotation AR and outboard of the center mast 116. For example, the outer mast 134 extends along an outer surface 120 of the center mast 116 so that, when the outer mast 134 is rotated, the outer mast 134 rotates about the center mast 116 and relative to the stationary center mast 116. The outer mast 134 may circumscribe at least a portion of the center mast 116. The outer mast 134, the center mast 116, and the inner mast 128 may be concentric.

The inner mast 128 extends along the inner cavity 118 of the center mast 116 and at least an upper portion 130 of the inner mast 128 extends from an upper end 126 of the center mast 116. Thus, a lower portion 132 of the inner mast 128 is rotatably mounted to the gearbox 112 and the upper portion 130 of the inner mast 128 extends above the upper end 126 of the center mast 116 and is exposed exterior the center mast 116 for receiving the upper rotor blade assembly 176.

The outer mast 134 extends from the gearbox 112 and along the outer surface 120 of the center mast 116 at a lower portion 124 of the center mast 116 so that the center mast 116 extends from an upper end 140 of the outer mast 134. Thus, a lower portion 136 of the outer mast 134 is rotatably mounted to the gearbox 112 while at least an upper portion 138 of the outer mast 134 is exposed exterior the helicopter body and, optionally surrounding the center mast 116, for receiving the lower rotor blade assembly 186. At least a portion of the stationary center mast 116 is thus exposed between the upper end 140 of the outer mast 134 and the upper end 126 of the center mast 116 and is configured to receive or support the control system 142.

Figure 2:
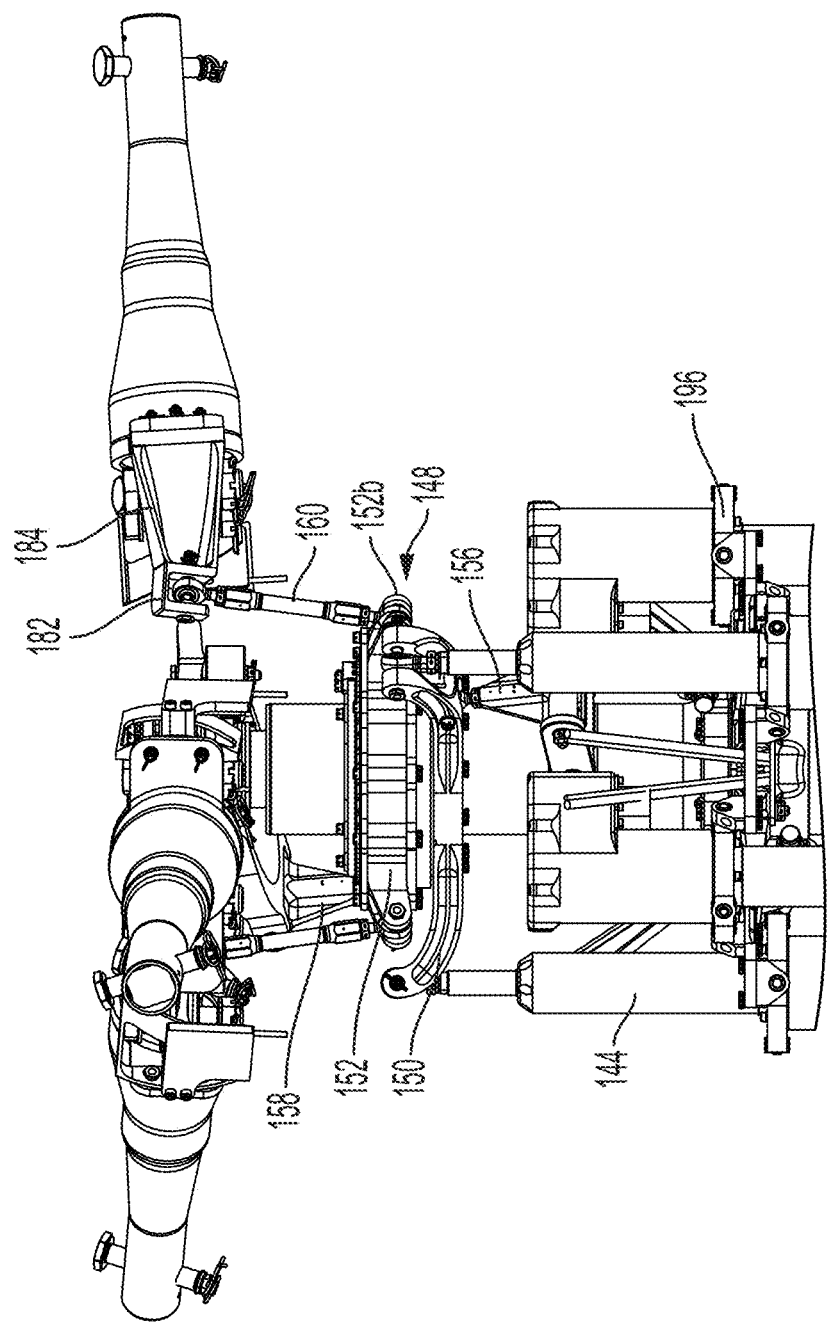
FIG. 2 is an enlarged view of the upper swashplate assembly of the coaxial rotor system of FIG. 1.
Figure 2A:
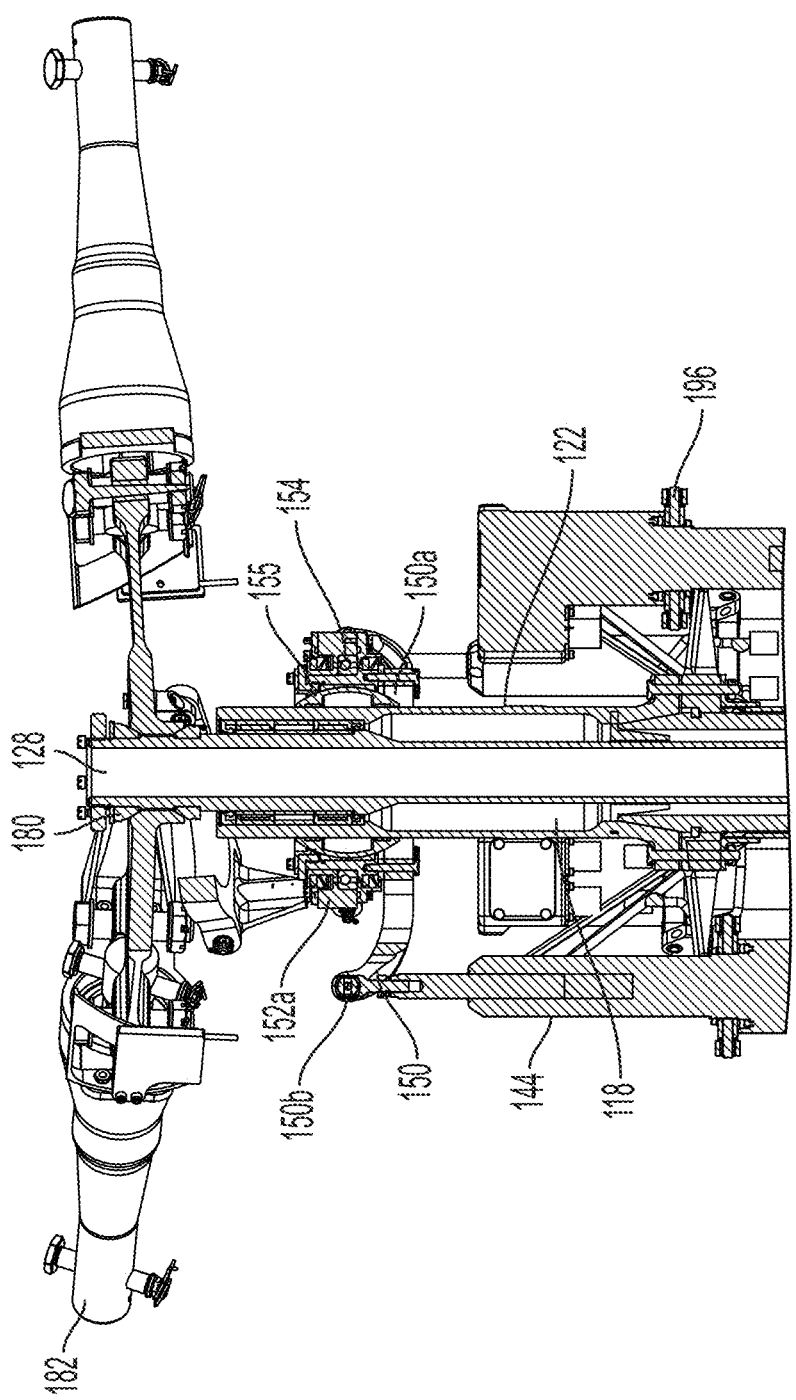
FIG. 2A is a cross-sectional view of the upper swashplate assembly and coaxial rotor system of FIG. 2.

As shown in FIGS. 2 and 2A, the upper rotor blade assembly 176 is disposed at or coupled to the upper portion 130 of the inner mast 128 so that a plurality of upper rotor blades 178 are rotatable in the first direction about the axis of rotation AR via rotation of the inner mast 128. For example, the upper rotor blade assembly 176 may be fixedly mounted to the inner mast 128 via a hub 180 of the upper rotor blade assembly 176 mounted to the inner mast 128. In the illustrated embodiment, the plurality of upper rotor blades 178 are mounted to the inner mast 128 via an upper rotor blade pitch assembly 182 connected to the hub 180. The upper rotor blade pitch assembly 182 is connected to the control system 142 for adjusting the pitch of the upper rotor blades 178. The upper rotor blade pitch assembly 182 includes a blade pitch horn 184 associated with each respective rotor blade 178 of the upper rotor blade assembly 176 and, as described below, each blade pitch horn 184 is independently connected to the control system 142 for independent control of the corresponding upper rotor blade 178.

Figure 3:
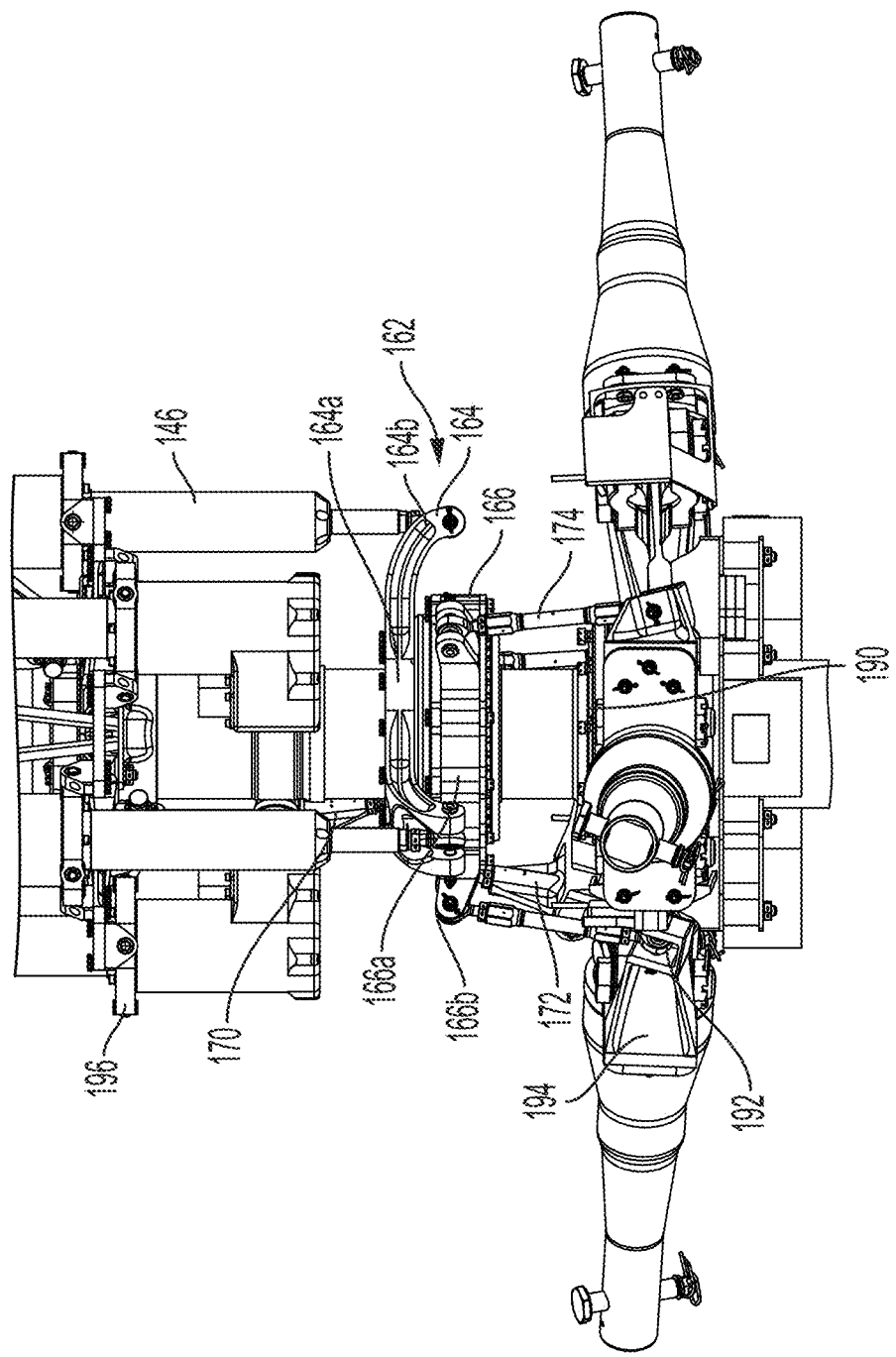
FIG. 3 is an enlarged view of the lower swashplate assembly of the coaxial rotor system of FIG. 1.
Figure 3A:
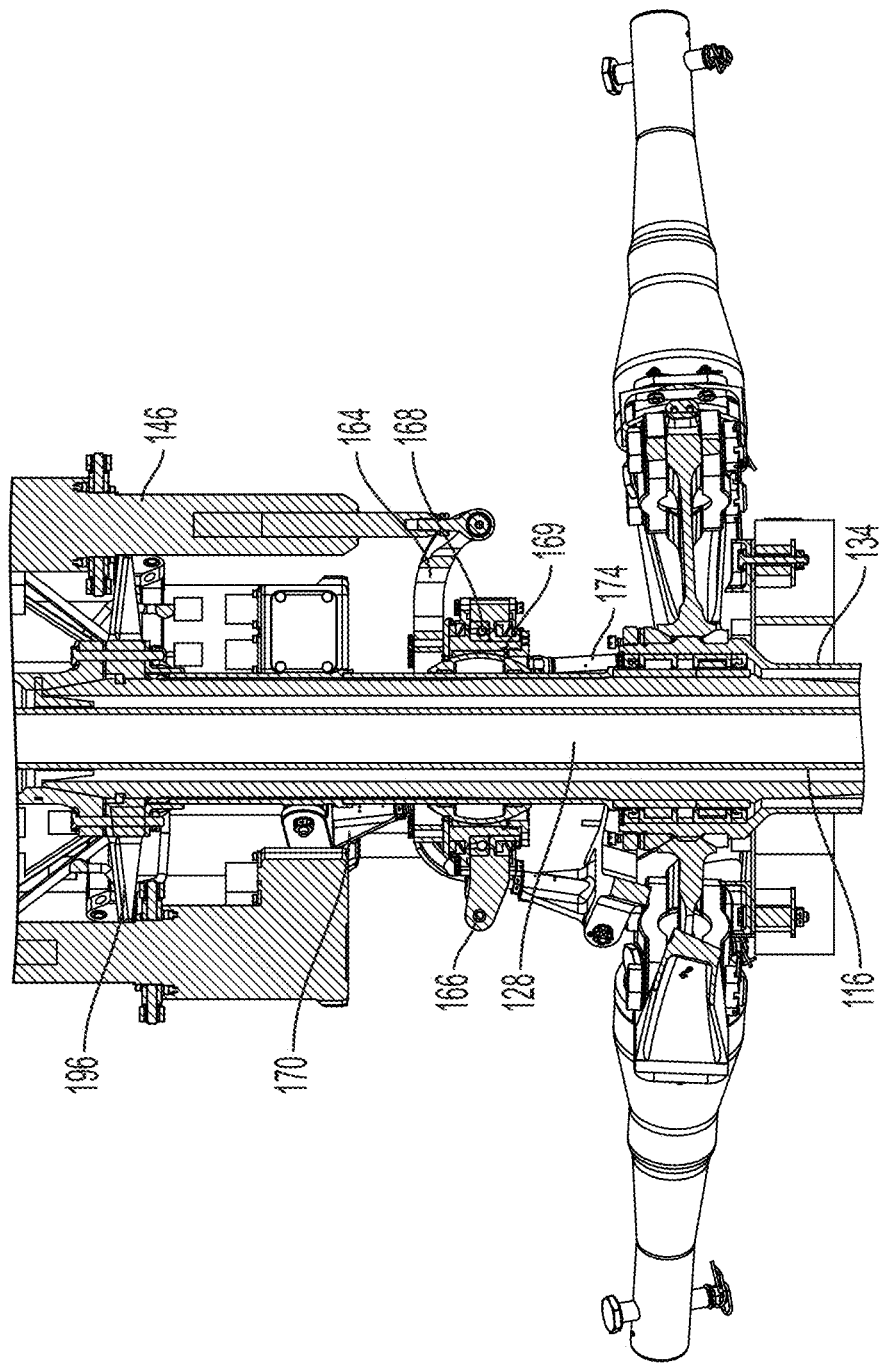
FIG. 3A is a cross-sectional view of the lower swashplate assembly and coaxial rotor system of FIG. 3.

As shown in FIGS. 3 and 3A, the lower rotor blade assembly 186 is disposed at or coupled to the upper portion 138 of the outer mast 134 so that a plurality of lower rotor blades 188 are rotatable in the second direction about the axis of rotation AR via rotation of the outer mast 134. For example, the lower rotor blade assembly 186 may be fixedly mounted to the outer mast 134 via a respective hub 190 of the lower rotor blade assembly 186 mounted to the outer mast 134. The plurality of lower rotor blades 188 are mounted to the outer mast 134 via a lower rotor blade pitch assembly 192 that is connected to the control system 142 for adjusting the pitch of the lower rotor blades 188. The lower rotor blade pitch assembly 192 includes a blade pitch horn 194 associated with each respective rotor blade 188 of the lower rotor blade assembly 186 and, as described below, each blade pitch horn 194 is independently connected to the control system 142 for independent control of the corresponding lower rotor blade 188.

Thus, each rotor blade assembly includes a plurality of rotor blades mounted to or coupled to or attached at the respective inner or outer rotatable mast with the pitch of each respective rotor blade adjustable via adjustment of respective blade pitch horns. Each rotor blade assembly may be mounted to the respective rotatable mast via a respective hub fixedly mounted to the mast with the plurality of rotor blades extending radially from the hub. The rotor system may have any number of rotor blades, for example, two or more, such as three or four or five or more rotor blades.

The control system 142 is disposed along or coupled to the stationary center mast 116 between the upper rotor blade assembly 176 and the lower rotor blade assembly 186 and includes an upper swashplate assembly 148 mechanically connected to the upper rotor blade assembly 176 and a lower swashplate assembly 162 mechanically connected to the lower rotor blade assembly 186. The control system 142 is operable to adjust the upper swashplate assembly 148 and the lower swashplate assembly 162 relative to the center mast 116, such as a position and a pitch of the respective swashplate assembly relative to the longitudinal axis $A_{116}$ of the center mast 116, to adjust pitch of the respective plurality of upper rotor blades 178 and plurality of lower rotor blades 188 relative to the axis of rotation AR. That is, adjusting the upper swashplate assembly 148 relative to the center mast 116 causes the pitch of the plurality of upper rotor blades 178 to change relative to the axis of rotation AR and adjusting the lower swashplate assembly 162 relative to the center mast 116 causes the pitch of the plurality of lower rotor blades 188 to change relative to the axis of rotation AR. As discussed further below, the control system 142 includes one or more actuators for adjusting position and pitch of the upper swashplate assembly 148 and the lower swashplate assembly 162 along the center mast 116.

One or more upper swashplate actuators 144 are operable to adjust a position of the upper swashplate assembly 148 along the center mast 116 and a pitch of the upper swashplate assembly 148 relative to the longitudinal axis $A_{116}$ of the center mast 116 to adjust pitch of the plurality of upper rotor blades 178 relative to the axis of rotation AR. Similarly, one or more lower swashplate actuators 146 are operable to adjust a position of the lower swashplate assembly 162 along the center mast 116 and a pitch of the lower swashplate assembly 162 relative to the longitudinal axis $A_{116}$ of the center mast 116 to adjust pitch of the plurality of lower rotor blades 188 relative to the axis of rotation AR.

In the illustrated embodiment, the upper swashplate actuators 144 and the lower swashplate actuators 146 are mounted to or coupled to or disposed at the center mast 116 between the upper rotor blade assembly 176 and the lower rotor blade assembly 186 (e.g., between the upper end of the center mast and the upper end of the outer mast). The swashplate actuators are mounted to a stationary mounting platform 196 disposed along the outer surface 120 of the center mast 116 and between the upper and lower swashplate assemblies. The mounting platform 196 may be integrally formed with the center mast 116 or, as shown, the mounting platform 196 may be mounted to the center mast 116, such as at an overlapping junction of an upper portion 122 of the center mast and the lower portion 124 fixedly mounted to the helicopter 10. Optionally, the swashplate actuators may be individually mounted to the center mast 116, such as to individual mounting platforms or brackets integrated with or extending from the center mast 116.

In the illustrated embodiment, the swashplate actuators include three upper swashplate actuators and three lower swashplate actuators. The upper swashplate actuators 144 and lower swashplate actuators 146 are independently operable to independently control pitch of the upper and lower rotor blades. In other words, the upper swashplate actuators 144 are operable to adjust a plane of the upper swashplate relative to the mast assembly to adjust pitch of the upper rotor blades 178, the lower swashplate actuators 146 are operable to adjust a plane of the lower swashplate relative to the mast assembly to adjust pitch of the lower rotor blades 188, and the operation of one set of actuators does not affect the operation of the other actuator and therefore does not affect the pitch of the other set of rotor blades. Moreover, the operation of one individual actuator does not affect the operation of another individual actuator. For example, operation of an individual upper swashplate actuator does not affect operation of another individual upper swashplate actuator or any of the lower swashplate actuators.

Furthermore, the individual upper and lower swashplate actuators are independently operable to adjust the pitch of the respective rotor blades. For example, each of the actuators of the upper or lower set of actuators may be actuated collectively to translate the respective swashplate assembly vertically along the center mast 116 and thus collectively adjust the pitch of the respective set of rotor blades. In other words, the rotor blades are pitched evenly via translation of the swashplate assembly along the longitudinal axis $A_{116}$ of the center mast 116 (e.g., vertical translation). The individual actuators may also be actuated independently (or to varying degrees relative to one another) to tilt or pitch the swashplate assembly relative to the longitudinal axis $A_{116}$ of the center mast 116 to pitch the blades up and down sinusoidally as the rotor rotates. Thus, the rotor blades are pitched cyclically via tilting of the swashplate assembly relative to the longitudinal axis $A_{116}$ of the center mast 116.

Each of the upper and lower swashplate actuators may comprise any suitable actuator (e.g., an electromechanical or hydraulic actuator) operable to vertically translate a rod or piston or linkage connected to the respective upper or lower swashplate assembly to affect the position and tilt of the swashplate assembly. As shown in FIG. 1A, wiring 198 for powering and controlling the actuators may be routed from the helicopter 10 through the gearbox 112 and along the stationary center mast 116 to the actuator platform 196 for connection to the individual actuators. Thus, the wiring 198 is routed to the control system 142 along the center mast 116 without compromise or impingement on the rotating components and systems of the coaxial rotor system.

The upper swashplate assembly 148 is disposed along and mounted to or coupled to the center mast 116 above the swashplate actuators 144 and below the upper rotor blade assembly 176. The upper swashplate assembly 148 includes a non-rotating ring 150 non-rotatably disposed along the center mast 116 and mechanically connected to the upper swashplate actuators 144 for adjusting the position and pitch of the upper swashplate assembly 148 when the upper swashplate actuators 144 are operated. The non-rotating ring 150 may be mechanically connected to the stationary center mast 116 via a stationary scissor linkage 156 for anti-rotation of the non-rotating ring 150.

A rotating ring 152 of the upper swashplate assembly 148 is rotatably disposed along the center mast 116 and is mechanically connected to the upper rotor blade assembly 176 for adjusting pitch of the upper rotor blades 178 when the position and pitch of the upper swashplate assembly 148 is adjusted. The rotating ring 152 may be mechanically connected to the upper rotor blade assembly 176, such as to the upper rotor hub 180, with a rotating scissor linkage 158 to drive and synchronize swashplate rotation with the rotation of the upper rotor blade assembly 176.

The upper swashplate assembly 148 (see FIGS. 2 and 2A) includes a cross-contact bearing 154 that provides the mounting interface between the non-rotating ring 150 and the rotating ring 152 and that retains the non-rotating ring 150 and the rotating ring 152 in the same translational and tilting position relative to the center mast 116 while allowing the rotating ring 152 to rotate about the non-rotating ring 150 and the center mast 116. For example, the upper swashplate cross-contact bearing 154 includes a ball bearing ring having a plurality of ball bearings disposed along a bearing race or ring or disposed between an inner race/ring and an outer race/ring, with the cross-contact bearing 154 disposed between the non-rotating ring 150 and the rotating ring 152. The cross-contact bearing 154 secures alignment of the rotating ring 152 relative to the non-rotating ring 150 while allowing for rotation of the rotating ring 152 about the non-rotating ring 150. That is, the cross-contact bearing 154 allows the rotating ring 152 to rotate about the non-rotating ring 150 while matching positional and tilting alignment between the two rings. The cross-contact bearing 154 does not allow tilting or translation of the rotating ring 152 and the non-rotating ring 150 relative to one another. The upper swashplate cross-contact bearing 154 rotates at the same rate as the upper rotor blade assembly 176.

A gimbal ball 155 (FIG. 2A) is disposed between the upper swashplate assembly 148 and the center mast 116 so that the upper swashplate assembly 148 may pitch and translate vertically relative to the center mast 116 while the rotating ring 152 remains rotatable (via the cross-contact bearing 154) relative to the non-rotating ring 150 throughout the range of motion of the upper swashplate assembly 148. Thus, the gimbal ball 155 allows the non-rotating ring 150 and the rotating ring 152 to simultaneously slide or translate up and down along the center mast 116 according to movement of the gimbal ball 155 along the center mast 116 and to tilt relative to the center mast 116 about the gimbal ball 155, and the gimbal ball 155 does not interfere with or restrict rotation about the center mast 116. That is, the rotating ring 152 is locked to the non-rotating ring 150 with respect to vertical and tilt position through the cross-contact bearing 154 and the rotating ring 152 and non-rotating ring 150 translate along the center mast 116 together and in tandem with the gimbal ball 155 and tilt or pivot relative to the center mast 116 together and in tandem about the gimbal ball 155.

The upper swashplate assembly 148 is mechanically connected to the upper rotor blade assembly 176 via upper rotor pitch links 160, which are fixed length links reaching from the upper swashplate rotating ring 152 to the upper rotor blade pitch assembly 182. That is, the upper rotor pitch links 160 extend between the upper swashplate rotating ring 152 and the upper rotor blade assembly 176. Each pitch link 160 mechanically connects to a respective upper blade pitch horn 184 to control pitch of each individual upper rotor blade 178.

The lower swashplate assembly 162 is disposed along and mounted to or coupled to the center mast 116 below the swashplate actuators and above the lower rotor blade assembly 186. The lower swashplate assembly 162 includes a non-rotating ring 164 non-rotatably disposed along the center mast 116 and mechanically connected to the lower swashplate actuators 146 for adjusting the position and pitch of the lower swashplate assembly 162 when the lower swashplate actuators 146 are operated. The non-rotating ring 164 may be mechanically connected to the stationary center mast 116 with a stationary scissor linkage 170 for anti-rotation of the non-rotating ring 164.

A rotating ring 166 of the lower swashplate assembly 162 is rotatably disposed along the center mast 116 and is mechanically connected to the lower rotor blade assembly 186 for adjusting pitch of the lower rotor blades 188 when the position and pitch of the lower swashplate assembly 162 is adjusted. The rotating ring 166 may be mechanically connected to the lower rotor hub 190, with a rotating scissor linkage 172 to drive and synchronize swashplate rotation with the rotation of the lower rotor blade assembly 186.

The lower swashplate assembly 162 (see FIGS. 3 and 3A) includes a cross-contact bearing 168 that provides the mounting interface between the non-rotating ring 164 and the rotating ring 166 and that retains the non-rotating ring 164 and the rotating ring 166 in the same translational and tilting position relative to the center mast 116 while allowing the rotating ring 166 to rotate about the non-rotating ring 164 and the center mast 116. For example, the lower swashplate cross-contact bearing 168 includes a ball bearing ring having a plurality of ball bearings disposed along a bearing race or ring or disposed between an inner race/ring and an outer race/ring, with the cross-contact bearing 168 disposed between the non-rotating ring 164 and the rotating ring 166. The cross-contact bearing 168 secures alignment of the rotating ring 166 relative to the non-rotating ring 164 while allowing for rotation of the rotating ring 166 about the non-rotating ring 164. That is, the cross-contact bearing 168 allows the rotating ring 166 to rotate about the non-rotating ring 164 while matching positional and tilting alignment between the two rings. The cross-contact bearing 168 does not allow tilting or translation of the rotating ring 166 and the non-rotating ring 164 relative to one another. The lower swashplate cross-contact bearing 168 rotates at the same rate as the lower rotor blade assembly 186.

A gimbal ball 169 (FIG. 3A) is disposed between the lower swashplate assembly 162 and the center mast 116 so that the lower swashplate assembly 162 may pitch and translate vertically relative to the center mast 116 while the rotating ring 166 remains rotatable (via the cross-contact bearing 168) relative to the non-rotating ring 164 throughout the range of motion of the lower swashplate assembly 162. Thus, the gimbal ball 169 allows the non-rotating ring 164 and the rotating ring 166 to simultaneously slide or translate up and down along the center mast 116 according to movement of the gimbal ball 169 along the center mast 116 and to tilt relative to the center mast 116 about the gimbal ball 169, and the gimbal ball 169 does not interfere with or restrict rotation about the center mast 116. Similar to the upper swashplate assembly 148, the non-rotating ring 164 and rotating ring 166 of the lower swashplate assembly 162 are locked with respect to vertical and tilt position relative to the center mast 116 through the cross-contact bearing 168 and the rotating ring 166 and the non-rotating ring 164 translate along the center mast 116 together and in tandem with the gimbal ball 169 and tilt relative to the center mast 116 together and in tandem about the gimbal ball 169.

As shown in FIGS. 2A and 3A, the respective gimbal balls 155, 169 of the upper and lower swashplate assemblies include respective partial spherical portions or elements at the center mast that allow for tilting and sliding of the respective rotating rings and non-rotating rings relative to the center mast and about the partial spherical element. In other words, the gimbal balls 155, 169 allow the respective swashplates to simultaneously slide up and down along the center mast 116 and tilt relative to the center mast 116. When the control system 142 is operated to adjust position of the respective upper and lower swashplate along the mast assembly 114, the respective non-rotating ring (and thus the respective rotating ring) translates along the center mast 116 together and in tandem with the respective gimbal ball. When the control system 142 is operated to adjust pitch of the respective upper and lower swashplate relative to the mast assembly 114, the respective non-rotating ring (and thus the respective rotating ring) tilts or pivots about the respective gimbal ball and relative to the center mast 116. Although shown and described as being coupled to the center mast via a gimbal ball configuration, the swashplates may optionally be coupled to the center mast 116 via other suitable gimbal construction, such as a universal joint style gimbal with a sliding joint, so that the swashplate assemblies may respectively translate and tilt relative to the center mast.

The lower swashplate assembly 162 is mechanically connected to the lower rotor blade assembly 186 via lower rotor pitch links 174, which are fixed length links reaching from the lower swashplate rotating ring 166 to the lower rotor blade pitch assembly 192. That is, the lower rotor pitch links 174 extend between the lower swashplate rotating ring 166 and the lower rotor blade assembly 186. Each pitch link 174 mechanically connects to a respective lower blade pitch horn 194 to control pitch of each individual lower rotor blade 188.

The non-rotating ring of both the upper and lower swashplate assemblies includes a respective hub portion circumscribing the center mast and a plurality of fingers or protrusions radially extending from the hub, where each protrusion mechanically connects to a respective upper or lower actuator. The hubs of the respective non-rotating rings are disposed at the respective gimbal balls and, although they are not rotatable about the gimbal ball, they are longitudinally (vertically) movable and tiltable relative to the mast assembly via the gimbal ball and operation of the connected actuators. The gimbal balls allow the non-rotating rings and rotating rings to be longitudinally movable and tiltable. For example, the non-rotating rings are disposed at the respective gimbal balls such that, when the non-rotating rings are translated along the mast assembly 114, the gimbal balls and non-rotating rings translate together and in tandem along the mast assembly 114. When the non-rotating rings are tilted relative to the mast assembly 114, the non-rotating rings tilt about the respective gimbal balls. Thus, the upper non-rotating ring 150 includes a hub 150a with protrusions 150b extending from the hub 150a and the lower non-rotating ring 164 includes a hub 164a with protrusions 164b extending from the hub 164a. Each protrusion may attach to the respective actuator via a respective bearing disposed at the protrusion so that the swashplate assembly may pitch and tilt relative to the vertical movement of the actuator.

Thus, when each upper or lower actuator acts in tandem on its respective protrusion of the non-rotating ring, the respective swashplate assembly translates along the longitudinal axis of the center mast (e.g., vertical translation) and when the upper or lower actuators act in varying degrees relative to one another along the longitudinal axis of the center mast (i.e., one actuator extends a greater distance than one or more other upper or lower actuators), a plane of the swashplate assembly may tilt relative to the longitudinal axis of the center mast. The stationary scissor may connect between the center mast and the hub of the non-rotating ring to provide torsional support to the swashplate assembly against any rotational force felt from the respective rotor blade assembly. Optionally, the stationary scissor may connect between the center mast and any suitable structure of the non-rotating ring, such as one of the protrusions.

Similar to the non-rotating rings, the rotating rings of both upper and lower swashplate assemblies also includes a hub portion circumscribing the center mast and a plurality of protrusions radially extending from the hub, where each protrusion mechanically connects to a respective pitch link mechanically connected to the respective upper or lower rotor blade assembly. The hubs of the respective rotating rings are disposed at the respective cross-contact bearings and are rotatable about the cross-contact bearing. The rotating rings are longitudinally movable and tiltable relative to the mast assembly via longitudinal movement of the non-rotating rings along the mast assembly with the respective gimbal ball and tilting of the non-rotating rings about the respective gimbal ball. In other words, the upper rotating ring 152 includes a hub 152a with protrusions 152b extending from the hub 152a and the lower rotating ring 166 includes a hub 166a with protrusions 166b extending from the hub 166a. Thus, when the swashplate assembly is translated along the longitudinal axis of the center mast or when a plane of the swashplate assembly is tilted about the longitudinal axis of the center mast, the movement may be imparted on the blade pitch assembly via the fixed length pitch links, which connect to the protrusions of the rotating ring via respective bearings disposed at the protrusions. The rotating scissor may connect between the hub (or an additional protrusion) of the rotating ring and the hub of the respective rotor blade assembly to link rotation of the rotor blade assembly and rotation of the rotating ring.

When the respective swashplate actuators, connected to the respective non-rotating rings of the upper and lower swashplates, are operated to adjust position and pitch of the respective swashplate assemblies, the actuators act upon the stationary non-rotating rings of the swashplate assemblies. Each rotating ring is positionally fixed relative to its corresponding non-rotating ring such that adjusting the position and pitch of the non-rotating ring correspondingly adjusts the position and pitch of the rotating ring. In other words, as the rotating ring rotates about the center mast, the position and pitch of the rotating ring relative to the center mast corresponds to the position and pitch of the non-rotating ring. The rotating rings are connected to the corresponding upper and lower rotor blade assemblies for translating the position and pitch of the swashplate assembly to pitch the respective upper and lower rotor blades. Thus, the actuators drive the non-rotating rings along the longitudinal axis $A_{116}$ of the center mast 116 (e.g., vertically) to affect collective pitch of the respective rotor blades and tilt a plane of the non-rotating rings relative to the longitudinal axis $A_{116}$ of the center mast 116 to affect cyclic pitch of the respective rotor blades. Because the upper and lower swashplates are independently controlled, a more direct and stiffer load path between the actuators and respective rotor blade assemblies is achieved.

Optionally, fairing may be disposed around the control system 142 and center mast 116 to provide an aerodynamic housing that houses or covers at least the actuators of the control system 142. Traditionally, a fairing at the rotating mast between the rotors of a coaxial rotor system must be made cylindrical and allowed to spin with the rotors and, if it is made into a more aerodynamic shape (airfoil), it must be anti-rotated through a complex counter-rotating clocking system that is both heavy and difficult to design. Because the center mast 116 of the present coaxial rotor system provides a stationary mounting position, an aerodynamically shaped, cost-effective, and lighter fairing may be easily mounted to the stationary center mast, eliminating the need for any counter-rotating clocking system.

Figure 4:
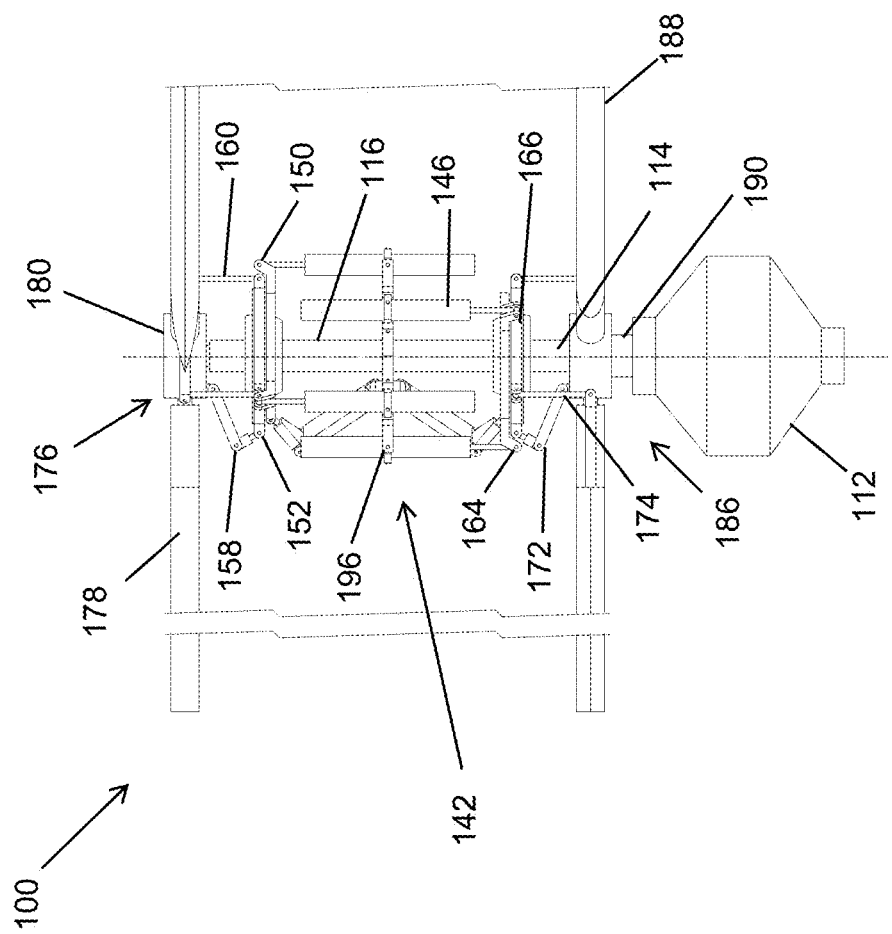
FIG. 4 is a perspective view of the coaxial rotor system in a default state with the upper rotor blades and the lower rotor blades at a flat pitch.
Figure 5:
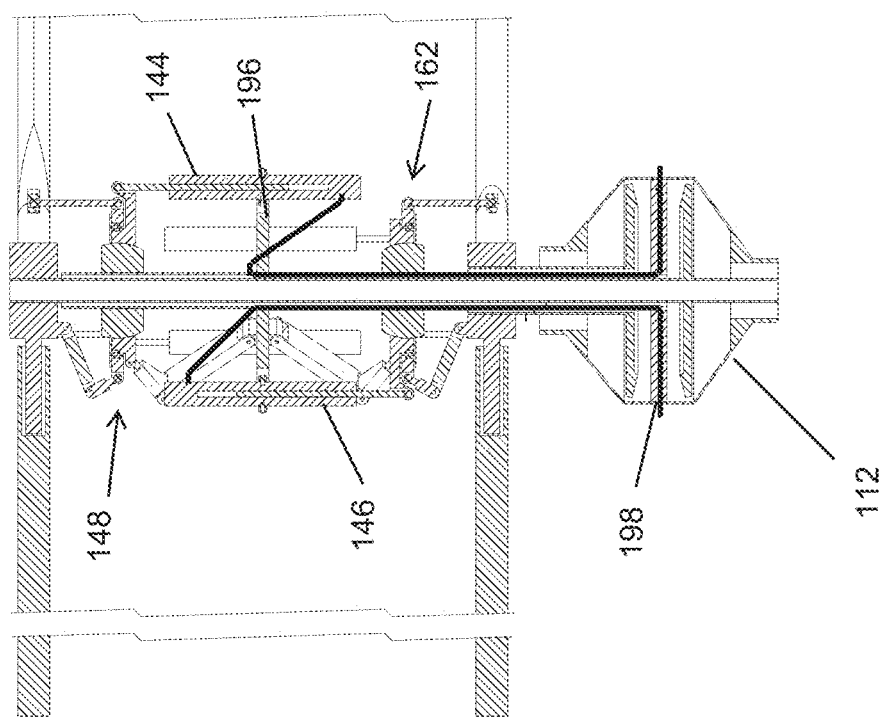
FIG. 5 is a cross-sectional view of the coaxial rotor system of FIG. 4.

It has been found desirable to have the same control stiffness for both the upper and lower rotor. Thus, and as shown in FIGS. 4 and 5, the coaxial rotor system 100 provides an identical control system path for both rotors, resulting in the same system stiffness for the upper rotor and the lower rotor, without undesired increases in weight or decreases in control stiffness for either rotor. That is, the control system 142 is non-rotatably disposed along the mast assembly 114 at the non-rotating center mast 116 and between the upper rotor blade assembly 176 and the lower rotor blade assembly 186 so that the control system 142 may have substantially similar mechanical linkages to the respective upper and lower rotor blade assemblies for adjusting the pitch of the upper and lower rotor blades. Put another way, connection between the control system 142 and the upper rotor blade assembly 176 may substantially mirror connection between the control system 142 and the lower rotor blade assembly 186.

For example, the control system 142 includes the upper swashplate actuators 144 and the lower swashplate actuators 146 that are non-rotatably mounted along or coupled to the center mast 116 via the mounting platform 196. The mounting platform 196 is mounted at a central region of the mast assembly 114 between the upper rotor blade assembly 176 and the lower rotor blade assembly 186, with the respective actuators extending above and below the mounting platform 196 to couple to the respective upper swashplate assembly 148 and lower swashplate assembly 162. The mounting platform 196 may be substantially equidistant from the upper swashplate assembly 148 and the lower swashplate assembly 162. The upper swashplate actuators 144 mechanically connect to the non-rotating ring 150 of the upper swashplate assembly 148 and the lower swashplate actuators 146 mechanically connect to the non-rotating ring 164 of the lower swashplate assembly 162. In a default state (i.e., with the upper and lower rotor blades at a flat pitch, such as shown in FIG. 4), the upper and lower non-rotating rings may be positioned equidistant relative to the mounting platform 196 along the mast assembly 114. Thus, the non-rotating portions of the control system 142, including the mounting platform 196, upper swashplate actuators 144, lower swashplate actuators 146, the upper swashplate non-rotating ring 150, and the lower swashplate non-rotating ring 164, may be substantially mirrored or similar between the mounting platform 196 and the upper rotor blade assembly 176 and the lower rotor blade assembly 186. Wiring 198 for the electromechanical actuators may be routed through the gearbox 112 and along the non-rotatable center mast 116 to the mounting platform 196 and thus does not affect or interfere with positioning of the non-rotating or rotating components of the control system 142.

Furthermore, the rotating or rotatable portions of the control system 142, including the upper swashplate rotating ring 152, the lower swashplate rotating ring 166, the upper swashplate rotating scissor linkage 158, the lower swashplate rotating scissor linkage 172, the upper rotor pitch links 160, and the lower rotor pitch links 174 may also be substantially mirrored or similar between the upper swashplate non-rotating ring 150 and the upper rotor blade assembly 176 and between the lower swashplate non-rotating ring 164 and the lower rotor blade assembly 186. As discussed further below, this allows the control system 142 to adjust the pitch of the upper rotor blades 178 and the pitch of the lower rotor blades 188 together and in tandem (e.g., FIGS. 6-10) in opposite directions and at equal magnitudes (e.g., FIGS. 11 and 12) or to adjust the pitch of the upper rotor blades 178 and the pitch of the lower rotor blades 188 separate and independent of one another (e.g., FIG. 13).

Figure 6:
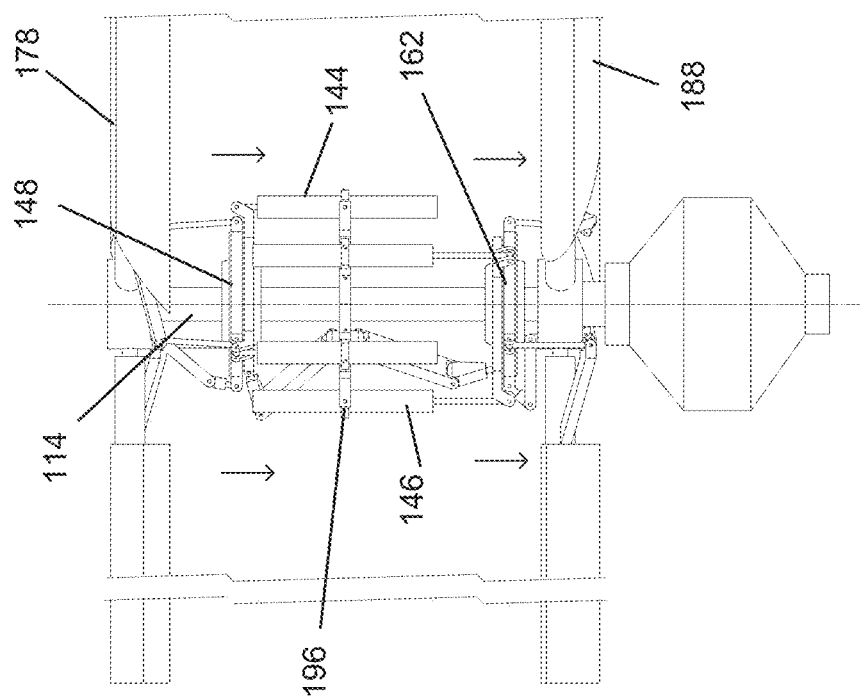
FIG. 6 is a perspective view of the coaxial rotor system in a full positive collective position with the upper rotor blades and the lower rotor blades pitched upward from the default state of FIG. 4.

As shown in FIG. 4, the control system 142 has been operated to position the upper rotor blades 178 and the lower rotor blades 188 at a flat pitch, or in a default state. To adjust the rotor blades from the default state shown in FIG. 4 to a full positive collective position shown in FIG. 6, both the upper swashplate assembly 148 and the lower swashplate assembly 162 are moved in the same direction (e.g., downward along the mast assembly 114 in FIG. 6) to pitch the upper rotor blades 178 and the lower rotor blades 188 upward. Thus, the upper swashplate actuators 144 may be collectively retracted to move the upper swashplate assembly 148 downward toward the mounting platform 196 and the lower swashplate actuators 146 may be collectively extended to move the lower swashplate assembly 162 downward away from the mounting platform 196. In FIG. 6, downward arrows represent movement of the upper swashplate assembly 148 and the lower swashplate assembly 162 along the mast assembly 114 compared to FIG. 4. As shown, the swashplate assemblies have been moved uniformly downward along the mast assembly 114 to collectively pitch the rotor blades upward.

Figure 7:
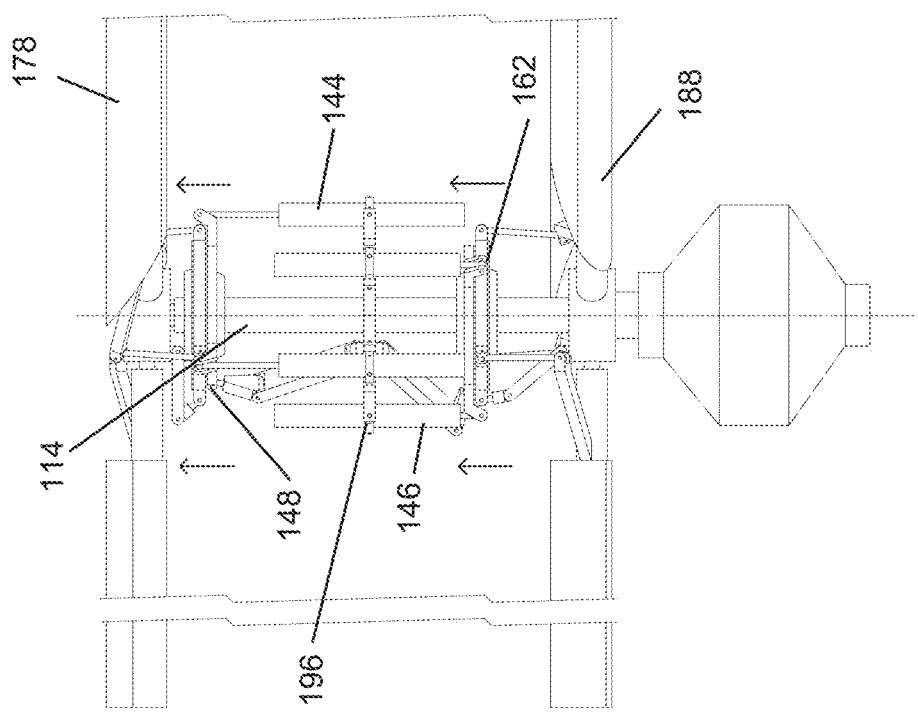
FIG. 7 is a perspective view of the coaxial rotor system in a full negative collective position with the upper rotor blades and the lower rotor blades pitched downward from the default state of FIG. 4.

When adjusting the rotor blades from the default state shown in FIG. 4 to a full negative collective position shown in FIG. 7, both the upper swashplate assembly 148 and the lower swashplate assembly 162 move in the same direction (e.g., upward along the mast assembly 114 in FIG. 7) to pitch the upper rotor blades 178 and the lower rotor blades 188 downward. Thus, the upper swashplate actuators 144 may be collectively extended to move the upper swashplate assembly 148 upward away from the mounting platform 196 and the lower swashplate actuators 146 may be collectively retracted to move the lower swashplate assembly 162 upward toward the mounting platform 196. In FIG. 7, upward arrows represent movement of the upper swashplate assembly 148 and the lower swashplate assembly 162 along the mast assembly 114 compared to FIG. 4. As shown, the swashplate assemblies have been moved uniformly upward along the mast assembly 114 to collectively pitch the rotor blades downward.

Figure 8:
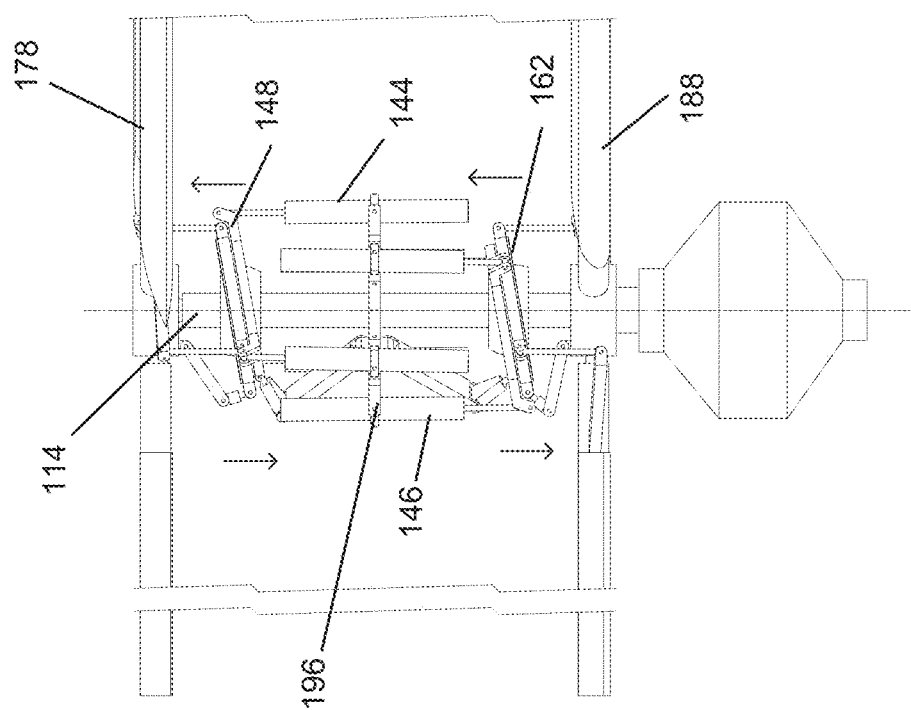
FIG. 8 is a perspective view of the coaxial rotor system in a forward tilting cyclic blade pitch position with the upper swashplate assembly and the lower swashplate assembly tilted forward from the default state of FIG. 4.

To adjust the rotor blades from the default state shown in FIG. 4 to a forward tilting cyclic blade pitch, as shown in FIG. 8, the upper rotor blades 178 and the lower rotor blades 188 are pitched downward when rotationally positioned at a first or rear facing side of the mast assembly 114 (right in FIG. 8) and the upper rotor blades 178 and the lower rotor blades 188 are pitched upward when rotationally positioned at a second or front facing side of the mast assembly 114 (left in FIG. 8). Thus, the upper and lower rotor blade pitch cyclically changes sinusoidally as the blades travel around the azimuth. That is, as the upper and lower rotor blades rotate about the axis of rotation AR, the pitch of the respective rotor blades change from being pitched downward when rotationally positioned at the rear facing side of the mast assembly 114 to being pitched upward when rotationally positioned at the front facing side of the mast assembly 114.

The upper swashplate assembly 148 and the lower swashplate assembly 162 are pitched in the same direction (e.g., downward along the front facing side of the mast assembly 114 and upward along the rear facing side of the mast assembly in FIG. 8) to tilt the respective swashplate assemblies forward and pitch the upper rotor blades 178 and the lower rotor blades 188 accordingly. Thus, upper swashplate actuators 144 affecting the front facing side of the upper swashplate assembly 148 may be retracted to move the front facing side of the upper swashplate assembly 148 downward toward the mounting platform 196 and upper swashplate actuators 144 affecting the rear facing side of the upper swashplate assembly 148 may be extended to move the rear facing side of the upper swashplate assembly 148 upward away from the mounting platform 196. Lower swashplate actuators 146 affecting the front facing side of the lower swashplate assembly 162 may be extended to move the front facing side of the lower swashplate assembly 162 downward away from the mounting platform 196 and lower swashplate actuators 146 affecting the rear facing side of the lower swashplate assembly 162 may be retracted to move the rear facing side of the lower swashplate assembly 162 upward toward the mounting platform 196. In FIG. 8, downward and upward arrows represent movement of the upper swashplate assembly 148 and the lower swashplate assembly 162 along the mast assembly 114 compared to FIG. 4. As shown, the swashplate assemblies have been uniformly tilted forward relative to the mast assembly (i.e., moved downward along the mast assembly 114 in a front facing direction and upward along the mast assembly in a rear facing direction) to enable a cyclic blade pitch.

Figure 9:
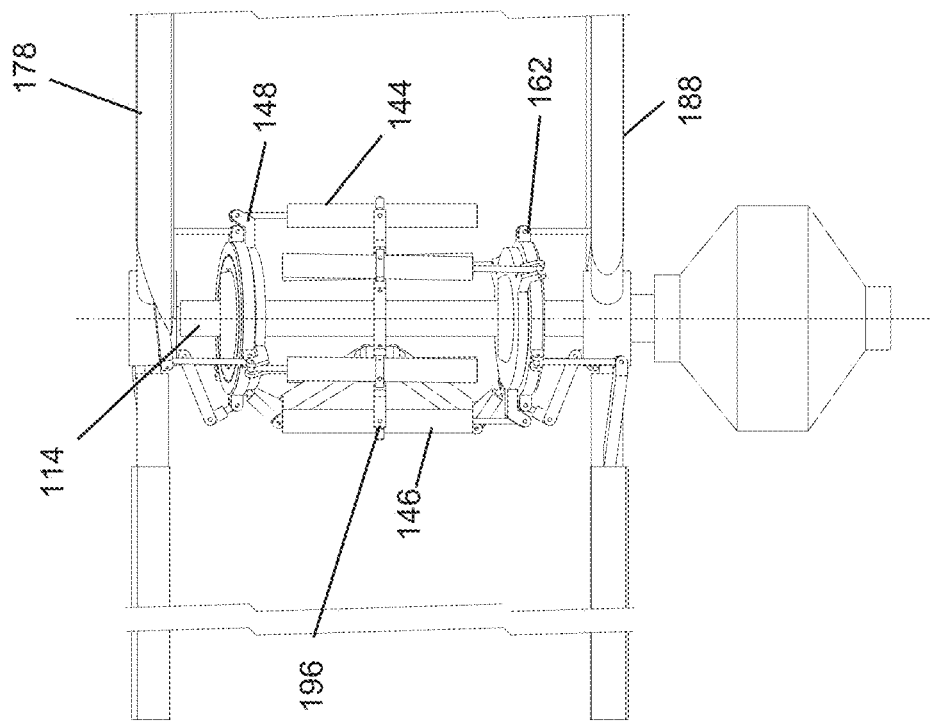
FIG. 9 is a perspective view of the coaxial rotor system in a leftward tilting cyclic blade pitch position with the upper swashplate assembly and the lower swashplate assembly tilted leftward from the default state of FIG. 4.

To adjust the rotor blades from the default state shown in FIG. 4 to a left tilting cyclic blade pitch, as shown in FIG. 9, the upper rotor blades 178 and the lower rotor blades 188 are pitched downward when rotationally positioned at a third or left facing side of the mast assembly 114 (where the left facing side is shown in FIG. 9) and the upper rotor blades 178 and the lower rotor blades 188 are pitched upward when rotationally positioned at a fourth or right facing side of the mast assembly 114 (where the right facing side is not shown in FIG. 9). Thus, the upper and lower rotor blade pitch cyclically changes sinusoidally as the blades travel around the azimuth. That is, as the upper and lower rotor blades rotate about the axis of rotation AR, the pitch of the respective rotor blades change from being pitched downward when rotationally positioned at the left facing side of the mast assembly 114 to being pitched upward when rotationally positioned at the right facing side of the mast assembly 114.

The upper swashplate assembly 148 and the lower swashplate assembly 162 are pitched in the same direction (e.g., downward along the left facing side of the mast assembly 114 and upward along the right facing side of the mast assembly in FIG. 9) to tilt the respective swashplate assemblies leftward and pitch the upper rotor blades 178 and the lower rotor blades 188 accordingly. Thus, upper swashplate actuators 144 affecting the left facing side of the upper swashplate assembly 148 may be retracted to move the left facing side of the upper swashplate assembly 148 downward toward the mounting platform 196 and upper swashplate actuators 144 affecting the right facing side of the upper swashplate assembly 148 may be extended to move the right facing side of the upper swashplate assembly 148 upward away from the mounting platform 196. Lower swashplate actuators 146 affecting the left facing side of the lower swashplate assembly 162 may be extended to move the left facing side of the lower swashplate assembly 162 downward away from the mounting platform 196 and lower swashplate actuators 146 affecting the right facing side of the lower swashplate assembly 162 may be retracted to move the right facing side of the lower swashplate assembly 162 upward toward the mounting platform 196. As shown, the swashplate assemblies have been uniformly tilted leftward relative to the mast assembly (i.e., moved downward along the mast assembly 114 in a left facing direction and upward along the mast assembly in a right facing direction) to enable a cyclic blade pitch.

Figure 10:
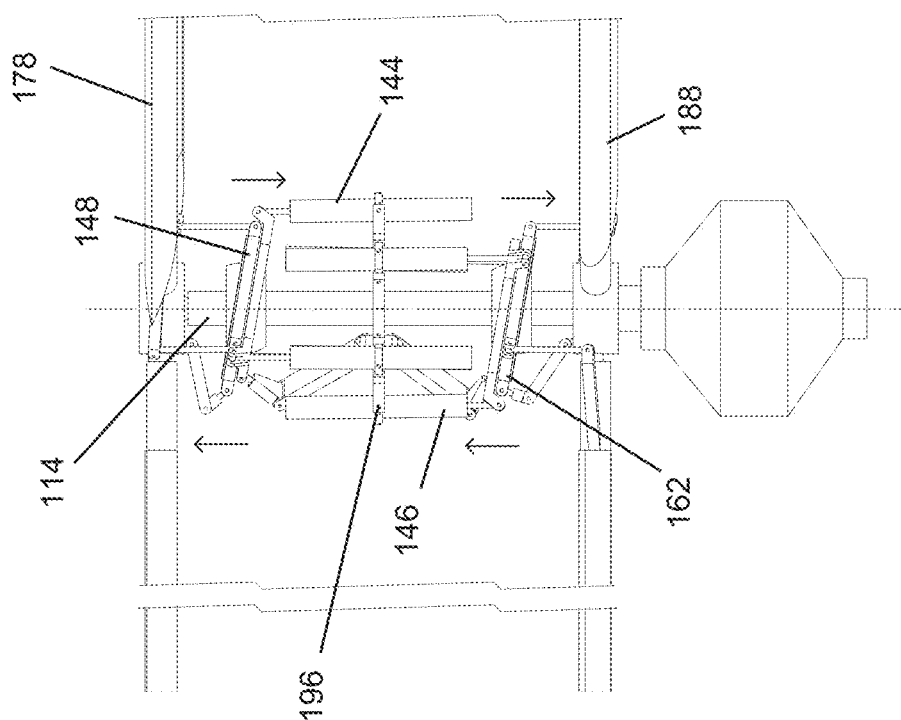
FIG. 10 is a perspective view of the coaxial rotor system in an aftward tilting cyclic blade pitch position with the upper swashplate assembly and the lower swashplate assembly tilted aftward from the default state of FIG. 4.

To adjust the rotor blades from the default state shown in FIG. 4 to a rearward or aftward tilting cyclic blade pitch, as shown in FIG. 10, the upper rotor blades 178 and the lower rotor blades 188 are pitched upward when rotationally positioned at the first or rear facing side of the mast assembly 114 (right in FIG. 10) and the upper rotor blades 178 and the lower rotor blades 188 are pitched downward when rotationally positioned at the second or front facing side of the mast assembly 114 (left in FIG. 10). Thus, the upper and lower rotor blade pitch cyclically changes sinusoidally as the blades travel around the azimuth. That is, as the upper and lower rotor blades rotate about the axis of rotation AR, the pitch of the respective rotor blades change from being pitched upward when rotationally positioned at the rear facing side of the mast assembly 114 to being pitched downward when rotationally positioned at the front facing side of the mast assembly 114.

The upper swashplate assembly 148 and the lower swashplate assembly 162 are pitched in the same direction (e.g., upward along the front facing side of the mast assembly 114 and downward along the rear facing side of the mast assembly in FIG. 10) to tilt the respective swashplate assemblies rearward or aftward and pitch the upper rotor blades 178 and the lower rotor blades 188 accordingly. Thus, upper swashplate actuators 144 affecting the rear or aft facing side of the upper swashplate assembly 148 may be retracted to move the rear or aft facing side of the upper swashplate assembly 148 downward toward the mounting platform 196 and upper swashplate actuators 144 affecting the front facing side of the upper swashplate assembly 148 may be extended to move the front facing side of the upper swashplate assembly 148 upward away from the mounting platform 196. Lower swashplate actuators 146 affecting the rear or aft facing side of the lower swashplate assembly 162 may be extended to move the rear or aft facing side of the lower swashplate assembly 162 downward away from the mounting platform 196 and lower swashplate actuators 146 affecting the front facing side of the lower swashplate assembly 162 may be retracted to move the front facing side of the lower swashplate assembly 162 upward toward the mounting platform 196. In FIG. 10, downward and upward arrows represent movement of the upper swashplate assembly 148 and the lower swashplate assembly 162 along the mast assembly 114 compared to FIG. 4. As shown, the swashplate assemblies have been uniformly tilted rearward or aftward relative to the mast assembly (i.e., moved downward along the mast assembly 114 in a rear or aft facing direction and upward along the mast assembly in a front facing direction) to enable a cyclic blade pitch.

Figure 11:
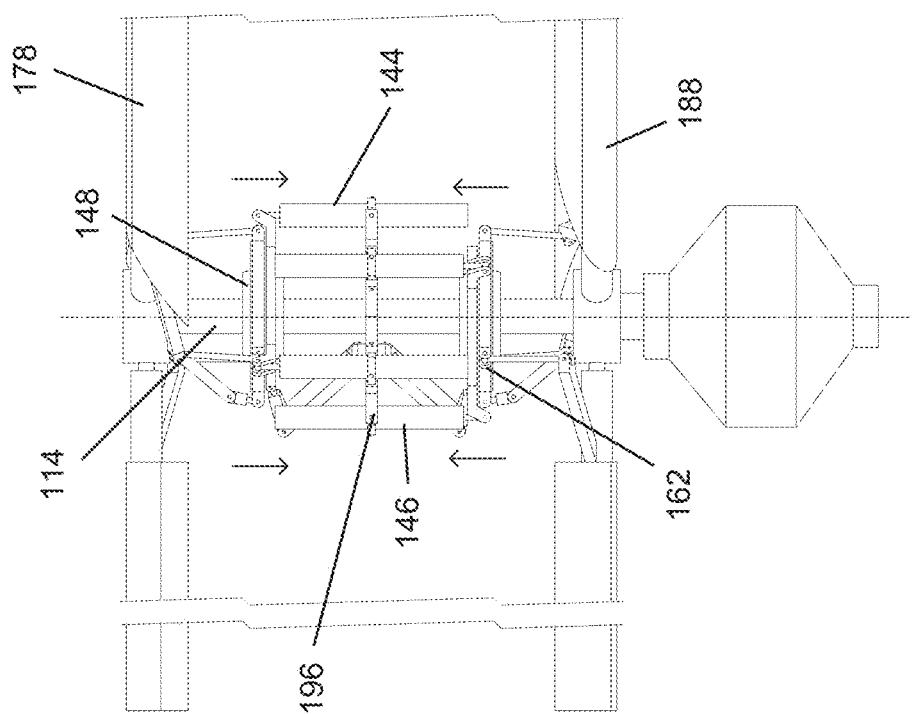
FIG. 11 is a perspective view of the coaxial rotor system in a max positive differential collective position with the upper rotor blades pitched upward and the lower rotor blades pitched downward from the default state of FIG. 4.

When adjusting the rotor blades from the default state shown in FIG. 4 to a max positive differential collective position shown in FIG. 11, the upper swashplate assembly 148 and the lower swashplate assembly 162 move in opposite directions along the mast assembly 114 to pitch the upper rotor blades 178 collectively up and to pitch the lower rotor blades 188 collectively down. That is, the upper swashplate assembly 148 is moved downward along the mast assembly 114 and the lower swashplate assembly 162 is moved upward along the mast assembly 114 in FIG. 11. Thus, the upper swashplate actuators 144 may be collectively retracted to move the upper swashplate assembly 148 downward toward the mounting platform 196 and the lower swashplate actuators 146 may be collectively retracted to move the lower swashplate assembly 162 upward toward the mounting platform 196. In FIG. 11, upward and downward arrows represent movement of the upper swashplate assembly 148 and the lower swashplate assembly 162 along the mast assembly 114 compared to FIG. 4. As shown, the swashplate assemblies have been moved uniformly toward one another and toward the mounting platform 196 along the mast assembly 114 to collectively pitch the upper rotor blades upward and to collectively pitch the lower rotor blades downward.

Figure 12:
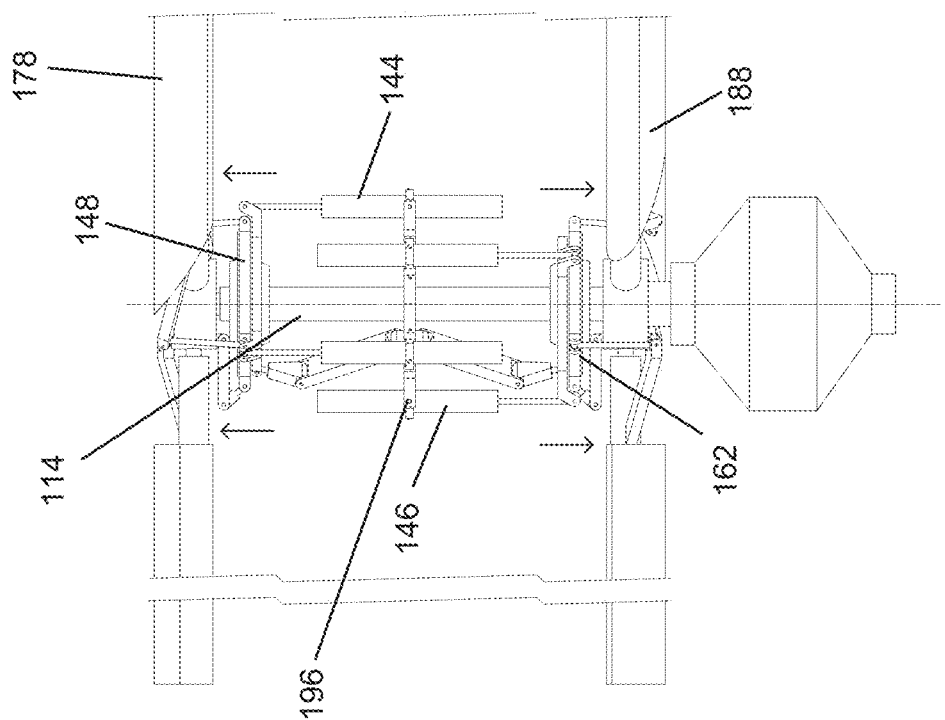
FIG. 12 is a perspective view of the coaxial rotor system in a max negative differential collective position with the upper rotor blades pitched downward and the lower rotor blades pitched upward from the default state of FIG. 4.

When adjusting the rotor blades from the default state shown in FIG. 4 to a max negative differential collective position shown in FIG. 12, the upper swashplate assembly 148 and the lower swashplate assembly 162 move in opposite directions along the mast assembly 114 to pitch the upper rotor blades 178 collectively down and to pitch the lower rotor blades 188 collectively up. That is, the upper swashplate assembly 148 is moved upward along the mast assembly 114 and the lower swashplate assembly 162 is moved downward along the mast assembly 114 in FIG. 12. Thus, the upper swashplate actuators 144 may be collectively extended to move the upper swashplate assembly 148 upward away from the mounting platform 196 and the lower swashplate actuators 146 may be collectively extended to move the lower swashplate assembly 162 downward away from the mounting platform 196. In FIG. 12, upward and downward arrows represent movement of the upper swashplate assembly 148 and the lower swashplate assembly 162 along the mast assembly 114 compared to FIG. 4. As shown, the swashplate assemblies have been moved uniformly away from one another and away from the mounting platform 196 along the mast assembly 114 to collectively pitch the upper rotor blades downward and to collectively pitch the lower rotor blades upward.

Figure 13:
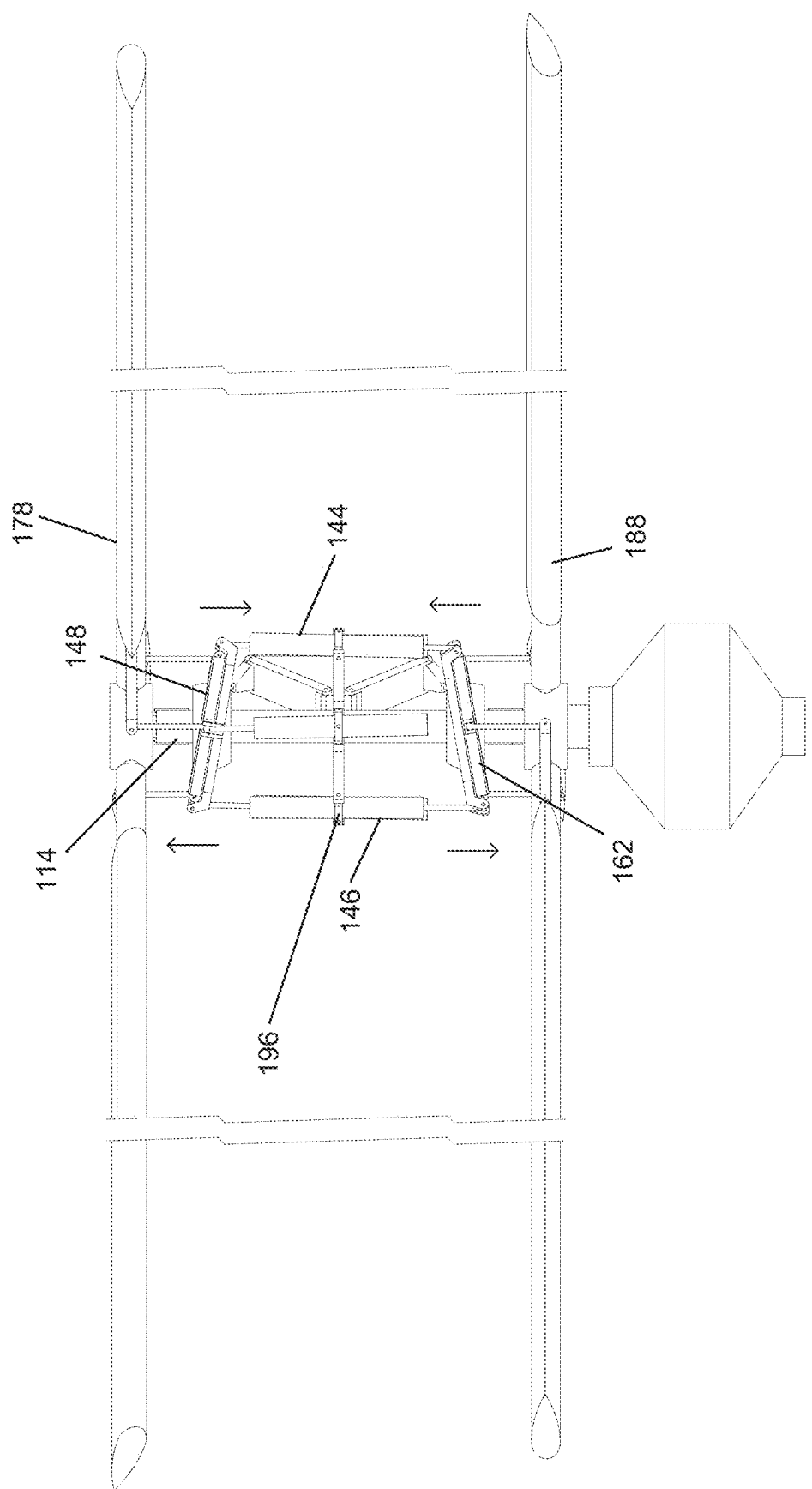
FIG. 13 is a perspective view of the coaxial rotor system in a differential cyclic position with the upper swashplate assembly tilted aftward and the lower swashplate assembly titled forward from the default state of FIG. 4.

As shown in FIG. 13, the control system 142 is also operable to adjust the rotor blades to a variety of differential cyclic positions where the pitch of the upper rotor blades 178 may be different from the pitch of the lower rotor blades 188 in both cyclic phase and magnitude. For example, the upper swashplate assembly 148 may be tilted aftward to enable a cyclic blade pitch where the upper rotor blades 178 are pitched up when rotationally positioned toward the rear or aft side of the mast assembly 114 and pitched down when rotationally positioned toward the front side of the mast assembly. Meanwhile, the lower swashplate assembly 162 may be tilted forward to enable a cyclic blade pitch where the lower rotor blades 188 are pitched down when rotationally positioned toward the rear or aft side of the mast assembly 114 and pitched up when rotationally positioned toward the front side of the mast assembly. Thus, both cyclic pitch magnitude and phasing can be adjusted for either rotor relative to one another. That is, the swashplates may tilt in different directions. Phasing between the upper and lower rotor sinusoidal cyclic pitch changes around the azimuth and may be of different magnitudes.

Thus, to adjust the rotor blades from the default state shown in FIG. 4 to the differential cyclic blade pitch position shown in FIG. 13, the upper rotor blades 178 are pitched upward when rotationally positioned at the first or rear facing side of the mast assembly 114 (right in FIG. 13) and the upper rotor blades 178 are pitched downward when rotationally positioned at the second or front facing side of the mast assembly 114 (left in FIG. 13). Meanwhile, the lower rotor blades 188 and are pitched downward when rotationally positioned at the first or rear facing side of the mast assembly 114 and the lower rotor blades 188 are pitched upward when rotationally positioned at the second or front facing side of the mast assembly 114. Thus, the upper and lower rotor blade pitches cyclically change sinusoidally as the blades travel around the azimuth and according to different phases. It should be understood that any variation of the differential cyclic blade pitch position may be possible. In other words, as the upper rotor blades 178 rotate about the axis of rotation AR, the pitch of the upper rotor blades 178 change from being pitched upward when rotationally positioned at the rear facing side of the mast assembly 114 to being pitched downward when rotationally positioned at the front facing side of the mast assembly 114. As the lower rotor blades 188 rotate about the axis of rotation AR, the pitch of the lower rotor blades 188 change from being pitched downward when rotationally positioned at the rear facing side of the mast assembly 114 to being pitched upward when rotationally positioned at the front facing side of the mast assembly 114.

In FIG. 13, the upper swashplate assembly 148 and the lower swashplate assembly 162 are pitched in the opposite directions to pitch the upper rotor blades 178 and the lower rotor blades 188 accordingly. Thus, upper swashplate actuators 144 affecting the rear or aft facing side of the upper swashplate assembly 148 may be retracted to move the rear or aft facing side of the upper swashplate assembly 148 downward toward the mounting platform 196 and upper swashplate actuators 144 affecting the front facing side of the upper swashplate assembly 148 may be extended to move the front facing side of the upper swashplate assembly 148 upward away from the mounting platform 196. Lower swashplate actuators 146 affecting the rear or aft facing side of the lower swashplate assembly 162 may be retracted to move the rear or aft facing side of the lower swashplate assembly 162 upward toward the mounting platform 196 and lower swashplate actuators 146 affecting the front facing side of the lower swashplate assembly 162 may be extended to move the front facing side of the lower swashplate assembly 162 downward away from the mounting platform 196. In FIG. 13, downward and upward arrows represent movement of the upper swashplate assembly 148 and the lower swashplate assembly 162 along the mast assembly 114 compared to FIG. 4.

Thus, the coaxial rotor system provides a location on which non-rotating items can easily be mounted between the rotors. For example, with the control system located between the upper and lower rotors, the pitch of the upper and lower rotor blades may be controlled independently from one another with independent upper and lower actuators, allowing for more precise adjustment of the blades during flight. The stationary mast between rotors also allows for use of any suitable type of actuators (e.g., electromechanical, hydraulic, electrohydraulic, and the like) and allows for a path through the gearbox and three mast arrangement to route the necessary wiring or hydraulic lines to power and control the actuators between the rotors. Optionally, the actuators may be electrohydraulic actuators and may include local hydraulic reservoirs, with electrical wiring routed along the mast assembly and through the gearbox.

Independent control of the upper and lower rotor blades allows for easy phase lag accommodation through programming of flight controls. Because each swashplate is independently controlled, the direction of the tilting angle of the swashplate can be adjusted electronically such that the max blade pitch angle occurs at the correct azimuthal position without the need for new hardware to be manufactured. Additionally, independent control of the upper and lower rotor blades allows for easy differential collective application because independent control of the swashplates allows for the collective setting of each rotor to be set independently.

The upper and lower swashplates rotate only with the respective upper or lower rotor blades and thus reduced swashplate bearing weight, increased swashplate bearing life, and reduced swashplate assembly size and weight may also be achieved. Both swashplates rotate at the same rate as the respective upper or lower rotor blades, which is within the speed capability of cross-contact bearings, thus reducing the bearing count to one bearing per swashplate. The weight and height of the swashplates assemblies themselves may thus be reduced, and reduction in the overall height of the upper swashplate assists in meeting the packaging constraints to fit both the upper and lower swashplates between the upper and lower rotor blades.

Furthermore, positioning of the control system between the upper and lower rotor blades reduces the overall rotor system height. Rotor spacing may be dictated by performance requirements and rotor blade deflections. In other words, the space between the rotors is present whether it is fully utilized or not. As both swashplates and all associated actuators and linkages are located between the rotors, the overall height of the rotor system above the aircraft is dictated only by the desired rotor spacing and clearance between the rotor blades and fuselage, resulting in a lower aircraft height, as there are no additional linkages or actuators between the lower rotor and the gearbox or below the gearbox. Moreover, the overall height of the rotor system inside the fuselage is reduced, creating more space for other components to be positioned closer to the rotor centerline and/or to allow for increased cabin space.

Therefore, a coaxial rotor system for a helicopter includes a central mast non-rotatably disposed at a helicopter, an inner mast disposed inboard of the central mast and rotatable about an axis of rotation relative to the central mast in a first direction, and an outer mast disposed outboard of the central mast and rotatable about the axis of rotation relative to the central mast in a second direction opposite the first direction, The inner mast extends above an upper end of the central mast and the central mast extends above an upper end of the outer mast. Upper rotor blades are coupled to the upper portion of the inner mast and lower rotor blades are coupled to the outer mast. The system is operable to independently adjust a pitch of the upper rotor blades and adjust a pitch of the lower rotor blades.

For example, one aspect of the present disclosure provides a coaxial rotor system for a helicopter. The coaxial rotor system includes a central mast non-rotatably disposed at a helicopter equipped with the coaxial rotor system. The central mast extends from the helicopter, and an axis of rotation of the coaxial rotor system extends along a longitudinal axis of the central mast. An inner mast is disposed inboard of the central mast and is rotatable about the axis of rotation relative to the central mast in a first direction. An upper portion of the inner mast extends above an upper end of the central mast. An outer mast is disposed outboard of the central mast and is rotatable about the axis of rotation relative to the central mast in a second direction opposite the first direction. The central mast extends above an upper end of the outer mast. An upper rotor blade assembly includes a plurality of upper rotor blades, and the upper rotor blade assembly is coupled to the upper portion of the inner mast. The plurality of upper rotor blades are rotatable about the axis of rotation in the first direction via rotation of the inner mast. A lower rotor blade assembly includes a plurality of lower rotor blades, and the lower rotor blade assembly is coupled to the outer mast. The plurality of lower rotor blades are rotatable about the axis of rotation in the second direction via rotation of the outer mast. A control system is coupled to the central mast between the upper rotor blade assembly and the lower rotor blade assembly. The control system includes (i) an upper swashplate mechanically connected to the upper rotor blade assembly, and (ii) a lower swashplate mechanically connected to the lower rotor blade assembly. The control system is operable to adjust the upper swashplate relative to the central mast to adjust a pitch of the plurality of upper rotor blades relative to the axis of rotation. The control system is operable to adjust the lower swashplate relative to the central mast to adjust a pitch of the plurality of lower rotor blades relative to the axis of rotation.

This aspect of the disclosure may include characteristics of one or more of the following optional implementations. In some implementations, the upper swashplate and the lower swashplate each include (i) a non-rotating ring non-rotatably disposed along the central mast and configured to be adjusted relative to the central mast when the control system is operated to adjust position and/or pitch of the respective swashplate to adjust the pitch of the respective rotor blades, and (ii) a rotating ring rotatably disposed along the central mast and connected to the respective rotor blade assembly for adjusting pitch of the respective rotor blades when the position and/or the pitch of the respective swashplate is adjusted. In further implementations, the respective rotating rings of the upper swashplate and the lower swashplate rotate about the axis of rotation according to rotation of the corresponding upper or lower rotor blade assembly, and the respective rotating rings rotate at a rate of rotation equal to a rate of rotation of the corresponding plurality of upper or lower rotor blades. In other further implementations, the respective rotating rings are rotatably mounted to the respective non-rotating rings via respective cross-contact bearings. In other further implementations, respective pitch links connect the respective rotating rings of the upper and lower swashplates to the respective upper and lower rotor blade assemblies. In other further implementations, the upper swashplate and the lower swashplate are each disposed along the central mast at a respective gimbal ball. The respective non-rotating rings of the upper swashplate and the lower swashplate, when the control system is operated to adjust position of the respective swashplate, translate along the central mast together and in tandem with the respective gimbal ball. The respective non-rotating rings of the upper swashplate and the lower swashplate, when the control system is operated to adjust pitch of the respective swashplate, pivot about the respective gimbal ball relative to the central mast.

In some embodiments, the control system includes at least one upper swashplate actuator that is operable to adjust the upper swashplate relative to the central mast to adjust the pitch of the plurality of upper rotor blades relative to the axis of rotation, and the control system includes at least one lower swashplate actuator that is operable to adjust the lower swashplate relative to the central mast to adjust the pitch of the plurality of lower rotor blades relative to the axis of rotation. In further embodiments, each upper swashplate actuator of the at least one upper swashplate actuator and each lower swashplate actuator of the at least one lower swashplate actuator are independently operable to adjust the pitch of the respective plurality of upper or lower rotor blades. In other further embodiments, the at least one upper swashplate actuator includes a plurality of upper swashplate actuators and the at least one lower swashplate actuator includes a plurality of lower swashplate actuators. In even further embodiments, the plurality of upper swashplate actuators includes three upper swashplate actuators and the plurality of lower swashplate actuators includes three lower swashplate actuators. In other even further embodiments, the plurality of upper swashplate actuators are independently operable to adjust a plane of the upper swashplate relative to the longitudinal axis of the central mast, and wherein the plurality of lower swashplate actuators are independently operable to adjust a plane of the lower swashplate relative to the longitudinal axis of the central mast. In other further embodiments, the at least one upper swashplate actuator and the at least one lower swashplate actuator are coupled to the central mast between the upper end of the central mast and the upper end of the outer mast. In some other even further embodiments, a fairing is coupled to the central mast above the outer mast to cover at least a portion of the control system for protective and aerodynamic drag reducing purposes. In some other even further embodiments, the at least one upper swashplate actuator and the at least one lower swashplate actuator each include electrically-operated actuators. In additional even further embodiments, wiring for the electrically-operated actuators is routed from a power source at the helicopter and along the central mast to the respective upper and lower swashplate actuators without compromise or impingement on rotating components and systems. The wiring may pass through a gearbox of the coaxial rotor system. Optionally, the electrically-operated actuators include electromechanical actuators. Optionally, the at least one upper swashplate actuator and the at least one lower swashplate actuator each include hydraulic actuators.

In some examples, the control system is coupled to the central mast between the upper end of the central mast and the upper end of the outer mast. Optionally, the outer mast circumscribes at least a portion of the central mast.

Another aspect of the present disclosure provides a coaxial rotor system for a helicopter that includes a gearbox disposed at a helicopter and a mast assembly that extends from the gearbox. The gearbox is operable to impart rotation of at least a portion of the mast assembly about an axis of rotation of the coaxial rotor system. The mast assembly includes a lower portion that rotates about the axis of rotation in a first direction, an upper portion that extends above the lower portion and that rotates about the axis of rotation in a second direction opposite the first direction, and a central portion that extends between the lower portion and the upper portion and that is not rotatable relative to the gearbox. A plurality of lower rotor blades are rotatable in the first direction via rotation of the lower portion of the mast assembly. A plurality of upper rotor blades are rotatable in the second direction via rotation of the upper portion of the mast assembly. The system is operable to adjust pitch of the plurality of lower rotor blades and to adjust pitch of the upper rotor blades independently from one another.

In some examples, the coaxial rotor system includes a gearbox disposed at a helicopter equipped with the coaxial rotor system. The coaxial rotor system includes a mast assembly. The mast assembly, when disposed at the helicopter, extends from the gearbox, and an axis of rotation of the coaxial rotor system extends along a longitudinal axis of the mast assembly. At least a portion of the mast assembly is rotatably coupled to the gearbox, and the gearbox is operable to impart rotation of at least the portion of the mast assembly about the axis of rotation. The mast assembly includes (i) a lower portion that, when the mast assembly is disposed at the helicopter, extends from the gearbox and is rotatably coupled to the gearbox, (ii) an upper portion that, when the mast assembly is disposed at the helicopter, extends above the first portion and is rotatably coupled to the gearbox, and (iii) a central portion that, when the mast assembly is disposed at the helicopter, extends between the lower portion and the upper portion and is not rotatable relative to the gearbox. The lower portion of the mast assembly, when the gearbox is operated to impart rotation of the lower portion, rotates about the axis of rotation in a first direction. The upper portion of the mast assembly, when the gearbox is operated to impart rotation of the upper portion, rotates about the axis of rotation in a second direction, and wherein the second direction is opposite the first direction. A lower rotor blade assembly includes a plurality of lower rotor blades, and the lower rotor blade assembly is coupled to the lower portion of the mast assembly. The plurality of lower rotor blades are rotatable about the axis of rotation in the first direction via rotation of the lower portion of the mast assembly. An upper rotor blade assembly includes a plurality of upper rotor blades, and the upper rotor blade assembly is coupled to the upper portion of the mast assembly. The plurality of upper rotor blades are rotatable about the axis of rotation in the second direction via rotation of the upper portion of the mast assembly. A control system is coupled to the central portion of the mast assembly between the lower rotor blade assembly and the upper rotor blade assembly. The control system includes (i) a lower swashplate mechanically connected to the lower rotor blade assembly, and (ii) an upper swashplate mechanically connected to the upper rotor blade assembly. The control system is operable to adjust the lower swashplate relative to the central portion of the mast assembly to adjust a pitch of the plurality of lower rotor blades relative to the axis of rotation. The control system is operable to adjust the upper swashplate relative to the central portion of the mast assembly to adjust a pitch of the plurality of upper rotor blades relative to the axis of rotation.

This aspect of the disclosure may include characteristics of one or more of the following optional implementations. In some implementations, the central portion of the mast assembly extends from the gearbox, and the lower portion of the mast assembly extends along the central portion of the mast assembly and is disposed outboard of the central portion of the mast assembly, and the central portion of the mast assembly extends above an upper end of the lower portion of the mast assembly.

In some examples, the upper portion of the mast assembly extends along the central portion of the mast assembly and is disposed inboard of the central portion of the mast assembly, and an upper end of the upper portion of the mast assembly extends above an upper end of the central portion of the mast assembly.

In some embodiments, the upper swashplate and the lower swashplate each includes (i) a non-rotating ring non-rotatably disposed along the central portion of the mast assembly and configured to be adjusted relative to the central portion of the mast assembly when the control system is operated to adjust position and/or pitch of the respective swashplate to adjust the pitch of the respective rotor blades, and (ii) a rotating ring rotatably disposed along the central portion of the mast assembly and connected to the respective rotor blade assembly for adjusting pitch of the respective rotor blades when the position and/or the pitch of the respective swashplate is adjusted. In further embodiments, the respective rotating rings of the upper swashplate and the lower swashplate rotate about the axis of rotation according to rotation of the corresponding upper or lower portion of the mast assembly, and wherein the respective rotating rings rotate at a rate of rotation equal to a rate of rotation of the corresponding upper or lower portion of the mast assembly. In other further embodiments, the respective rotating rings are rotatably mounted to the respective non-rotating rings via respective cross-contact bearings. In other further embodiments, respective pitch links connect the respective rotating rings of the upper and lower swashplates to the respective upper and lower rotor blade assemblies. In other further embodiments, the upper swashplate and the lower swashplate are each disposed along the central portion of the mast assembly at a respective gimbal ball. The respective non-rotating rings of the upper swashplate and the lower swashplate, when the control system is operated to adjust position of the respective swashplate, translate along the central portion of the mast assembly together and in tandem with the respective gimbal ball. The respective non-rotating rings of the upper swashplate and the lower swashplate, when the control system is operated to adjust pitch of the respective swashplate, pivot about the respective gimbal ball relative to the central portion of the mast assembly.

In some implementations, the control system includes at least one upper swashplate actuator that is operable to adjust the upper swashplate relative to the central portion of the mast assembly to adjust the pitch of the plurality of upper rotor blades relative to the axis of rotation, and the control system includes at least one lower swashplate actuator that is operable to adjust the lower swashplate relative to the central portion of the mast assembly to adjust the pitch of the plurality of lower rotor blades relative to the axis of rotation. In further implementations, each upper swashplate actuator of the at least one upper swashplate actuator and each lower swashplate actuator of the at least one lower swashplate actuator are independently operable to adjust the pitch of the respective plurality of upper or lower rotor blades. In other further implementations, the at least one upper swashplate actuator includes a plurality of upper swashplate actuators and the at least one lower swashplate actuator includes a plurality of lower swashplate actuators. In even further implementations, the plurality of upper swashplate actuators includes three upper swashplate actuators and the plurality of lower swashplate actuators includes three lower swashplate actuators. In other even further implementations, the plurality of upper swashplate actuators are independently operable to adjust a plane of the upper swashplate relative to the longitudinal axis of the mast assembly, and the plurality of lower swashplate actuators are independently operable to adjust a plane of the lower swashplate relative to the longitudinal axis of the mast assembly. In other further implementations, the at least one upper swashplate actuator and the at least one lower swashplate actuator are coupled to the central portion of the mast assembly between an upper end of the central portion of the mast assembly and an upper end of the lower portion of the mast assembly. In even further implementations, a fairing is coupled to the central portion of the mast assembly above the lower portion of the mast assembly to cover at least a portion of the control system for protective and aerodynamic drag reducing purposes. In other even further implementations, the at least one upper swashplate actuator and the at least one lower swashplate actuator each include electrically-operated actuators. In additional further implementations, wiring for the electrically-operated actuators is routed from a power source at the helicopter and along the central portion of the mast assembly to the respective upper and lower swashplate actuators without compromise or impingement on rotating components and systems. Optionally, the wiring passes through the gearbox. Optionally, the electrically-operated actuators include electromechanical actuators. Optionally, the at least one upper swashplate actuator and the at least one lower swashplate actuator each include hydraulic actuators.

Optionally, the control system is coupled to the central portion of the mast assembly between an upper end of the central portion of the mast assembly and an upper end of the lower portion of the mast assembly. Optionally, at least a portion of the upper portion of the mast assembly is disposed along an inner cavity of the central portion of the mast assembly. Optionally, the inner portion of the mast assembly circumscribes at least a portion of the central portion of the mast assembly.

Changes and modifications in the specifically described embodiments may be carried out without departing from the principles of the present invention, which is intended to be limited only by the scope of the appended claims as interpreted according to the principles of patent law.

The invention claimed is:

1. A coaxial rotor system, the coaxial rotor system comprising:
    a mast assembly;
    a plurality of upper rotor blades disposed at the mast assembly, wherein the plurality of upper rotor blades rotate about an axis of rotation in a first direction;
    a plurality of lower rotor blades disposed at the mast assembly spaced from the plurality of upper rotor blades, wherein the plurality of lower rotor blades rotate about the axis of rotation in a second direction opposite the first direction;
    wherein the mast assembly extends from a gearbox, and wherein the plurality of lower rotor blades are disposed at the mast assembly between the plurality of upper rotor blades and the gearbox, and wherein the gearbox is operable (i) to impart rotation of the plurality of upper rotor blades about the axis of rotation in the first direction and (ii) to impart rotation of the plurality of lower rotor blades about the axis of rotation in the second direction;
    a control system disposed at the mast assembly between the plurality of upper rotor blades and the plurality of lower rotor blades, wherein the control system comprises (i) an upper swashplate connected to the plurality of upper rotor blades and (ii) a lower swashplate connected to the plurality of lower rotor blades;
    wherein the control system adjusts the upper swashplate relative to the mast assembly to adjust a pitch of the plurality of upper rotor blades relative to the axis of rotation;
    wherein the control system adjusts the lower swashplate relative to the mast assembly to adjust a pitch of the plurality of lower rotor blades relative to the axis of rotation; and
    wherein the control system is operable to adjust the upper swashplate and the lower swashplate relative to the mast assembly independently of one another.

2. The coaxial rotor system of claim 1, wherein the mast assembly comprises (i) an upper portion that rotates about the axis of rotation in the first direction, (ii) a lower portion that rotates about the axis of rotation in the second direction and (iii) a central portion between the upper portion and the lower portion that does not rotate about the axis of rotation.

3. The coaxial rotor system of claim 2, wherein the plurality of upper rotor blades are coupled to the upper portion of the mast assembly, and wherein the plurality of lower rotor blades are coupled to the lower portion of the mast assembly, and wherein the control system is coupled to the central portion of the mast assembly.

4. The coaxial rotor system of claim 2, wherein the upper portion of the mast assembly is disposed at least partially inboard of the central portion of the mast assembly, and wherein the central portion of the mast assembly is disposed at least partially inboard of the lower portion of the mast assembly.

5. The coaxial rotor system of claim 1, wherein the upper swashplate and the lower swashplate each comprises (i) a non-rotating portion non-rotatably disposed at the mast assembly, and (ii) a rotating portion that rotates about the axis of rotation according to rotation of the corresponding plurality of upper rotor blades or the plurality of lower rotor blades.

6. The coaxial rotor system of claim 5, wherein the respective rotating portions of the upper swashplate and the lower swashplate rotate about the axis of rotation at a rate of rotation equal to a rate of rotation of the corresponding plurality of upper rotor blades or the plurality of lower rotor blades.

7. The coaxial rotor system of claim 1, wherein the control system further comprises (i) at least one upper swashplate actuator that is operable to adjust the upper swashplate relative to the mast assembly and (ii) at least one lower swashplate actuator that is operable to adjust the lower swashplate relative to the mast assembly.

8. The coaxial rotor system of claim 7, wherein each upper swashplate actuator of the at least one upper swashplate actuator and each lower swashplate actuator of the at least one lower swashplate actuator are independently operable to adjust the respective pitches of the plurality of upper rotor blades and the plurality of lower rotor blades.

9. The coaxial rotor system of claim 7, wherein each upper swashplate actuator of the at least one upper swashplate actuator and each lower swashplate actuator of the at least one lower swashplate actuator are coupled to the mast assembly between the plurality of upper rotor blades and the plurality of lower rotor blades.

10. The coaxial rotor system of claim 7, wherein each upper swashplate actuator of the at least one upper swashplate actuator is connected to a non-rotating portion of the upper swashplate that is non-rotatably disposed at the mast assembly, and wherein each lower swashplate actuator of the at least one lower swashplate actuator is connected to a non-rotating portion of the lower swashplate that is non-rotatably disposed at the mast assembly.

11. The coaxial rotor system of claim 7, wherein the at least one upper swashplate actuator and the at least one lower swashplate actuator comprise one selected from the group consisting of (i) electrically-operated actuators, (ii) electromechanical actuators, and (iii) hydraulic actuators.

12. The coaxial rotor system of claim 1, wherein the control system is operable to adjust the upper swashplate and the lower swashplate relative to the mast assembly to adjust the respective pitches of the plurality of upper rotor blades and the plurality of lower rotor blades together and in tandem.

13. The coaxial rotor system of claim 1, wherein a fairing is coupled to the mast assembly between the plurality of upper rotor blades and the plurality of lower rotor blades, and wherein the fairing does not rotate about the axis of rotation.

14. The coaxial rotor system of claim 1, wherein the coaxial rotor system is disposed at a helicopter equipped with the coaxial rotor system.

15. The coaxial rotor system of claim 14, wherein wiring for the control system is routed from a power source at the helicopter and at least partially along the mast assembly to the control system, and wherein the wiring passes through the gearbox of the coaxial rotor system.

16. A coaxial rotor system, the coaxial rotor system comprising:
    a mast assembly comprising (i) an upper portion that rotates about an axis of rotation in a first direction, (ii)

a lower portion that rotates about the axis of rotation in a second direction opposite the first direction and (iii) a central portion between the upper portion and the lower portion that does not rotate about the axis of rotation;

a plurality of upper rotor blades disposed at the upper portion of the mast assembly, wherein the plurality of upper rotor blades rotate about the axis of rotation in the first direction via rotation of the upper portion of the mast assembly;

a plurality of lower rotor blades disposed at the lower portion of the mast assembly, wherein the plurality of lower rotor blades rotate about the axis of rotation in the second direction via rotation of the lower portion of the mast assembly;

wherein the mast assembly extends from a gearbox, and wherein the plurality of lower rotor blades are disposed at the lower portion of the mast assembly between the plurality of upper rotor blades and the gearbox, and wherein the gearbox is operable (i) to impart rotation of the upper portion of the mast assembly and the plurality of upper rotor blades about the axis of rotation in the first direction and (ii) to impart rotation of the lower portion of the mast assembly and the plurality of lower rotor blades about the axis of rotation in the second direction;

a control system disposed at the central portion of the mast assembly;

wherein the control system is operable to adjust a pitch of the plurality of upper rotor blades relative to the axis of rotation; and wherein the control system is operable to adjust a pitch of the plurality of lower rotor blades relative to the axis of rotation.

17. The coaxial rotor system of claim 16, wherein the plurality of upper rotor blades are coupled to the upper portion of the mast assembly, and wherein the plurality of lower rotor blades are coupled to the lower portion of the mast assembly, and wherein the control system is coupled to the central portion of the mast assembly.

18. The coaxial rotor system of claim 16, wherein the upper portion of the mast assembly is disposed at least partially inboard of the central portion of the mast assembly, and wherein the central portion of the mast assembly is disposed at least partially inboard of the lower portion of the mast assembly.

19. The coaxial rotor system of claim 16, wherein the control system is operable to adjust the pitch of the plurality of upper rotor blades and the pitch of the plurality of lower rotor blades independently of one another.

20. The coaxial rotor system of claim 16, wherein the control system is operable to adjust the pitch of the plurality of upper rotor blades and the pitch of the plurality of lower rotor blades together and in tandem.

21. The coaxial rotor system of claim 16, wherein the control system comprises (i) an upper swashplate connected to the plurality of upper rotor blades and adjustable relative to the central portion of the mast assembly to adjust the pitch of the plurality of upper rotor blades relative to the axis of rotation and (ii) a lower swashplate connected to the plurality of lower rotor blades and adjustable relative to the central portion of the mast assembly to adjust the pitch of the plurality of lower rotor blades relative to the axis of rotation.

22. The coaxial rotor system of claim 21, wherein the upper swashplate and the lower swashplate each comprises (i) a non-rotating portion non-rotatably disposed at the central portion of the mast assembly, and (ii) a rotating portion that rotates about the axis of rotation according to rotation of the corresponding plurality of upper rotor blades or the plurality of lower rotor blades.

23. The coaxial rotor system of claim 22, wherein the respective rotating portions of the upper swashplate and the lower swashplate rotate about the axis of rotation at a rate of rotation equal to a rate of rotation of the corresponding plurality of upper rotor blades or the plurality of lower rotor blades.

24. The coaxial rotor system of claim 21, wherein the control system further comprises (i) at least one upper swashplate actuator that is operable to adjust the upper swashplate relative to the central portion of the mast assembly and (ii) at least one lower swashplate actuator that is operable to adjust the lower swashplate relative to the central portion of the mast assembly.

25. The coaxial rotor system of claim 24, wherein each upper swashplate actuator of the at least one upper swashplate actuator and each lower swashplate actuator of the at least one lower swashplate actuator are independently operable to adjust the respective pitches of the plurality of upper rotor blades and the plurality of lower rotor blades.

26. The coaxial rotor system of claim 24, wherein each upper swashplate actuator of the at least one upper swashplate actuator and each lower swashplate actuator of the at least one lower swashplate actuator are coupled to the central portion of the mast assembly.

27. The coaxial rotor system of claim 24, wherein the at least one upper swashplate actuator and the at least one lower swashplate actuator comprise one selected from the group consisting of (i) electrically-operated actuators, (ii) electromechanical actuators, and (iii) hydraulic actuators.

28. The coaxial rotor system of claim 16, wherein a fairing is coupled to the central portion of the mast assembly.

29. The coaxial rotor system of claim 16, wherein the coaxial rotor system is disposed at a helicopter equipped with the coaxial rotor system.

30. A coaxial rotor system, the coaxial rotor system comprising:

a gearbox configured to be disposed at a helicopter equipped with the coaxial rotor system;

a mast assembly extending from the gearbox, wherein, with the gearbox disposed at the equipped helicopter, the gearbox is operable to impart rotation of the mast assembly;

wherein the mast assembly comprises (i) an upper mast that, when the gearbox is operated to impart rotation of the mast assembly, rotates about an axis of rotation in a first direction, (ii) a lower mast that, when the gearbox is operated to impart rotation of the mast assembly, rotates about the axis of rotation in a second direction opposite the first direction, and (iii) a central mast between the lower mast and the upper mast, wherein the central mast does not rotate about the axis of rotation;

wherein a lower portion of the upper mast is disposed along and within the central mast, and wherein a lower portion of the central mast is disposed along and within the lower mast;

a plurality of upper rotor blades disposed at the upper mast above the central mast, wherein, when the gearbox is operated to impart rotation of the mast assembly, the plurality of upper rotor blades rotate about the axis of rotation in the first direction via rotation of the upper mast;

a plurality of lower rotor blades disposed at the lower mast below the central mast, wherein, when the gearbox is operated to impart rotation of the mast assembly, the plurality of lower rotor blades rotate about the axis of rotation in the second direction via rotation of the lower mast;

wherein the plurality of lower rotor blades are disposed at the mast assembly between the plurality of upper rotor blades and the gearbox; and a control system disposed at the central mast, wherein the control system is operable to (i) adjust a pitch of the plurality of upper rotor blades relative to the axis of rotation and (ii) adjust a pitch of the plurality of lower rotor blades relative to the axis of rotation.

31. The coaxial rotor system of claim 30, wherein the control system comprises (i) an upper swashplate that connects to the plurality of upper rotor blades and that is adjustable relative to the central mast and (ii) a lower swashplate that connects to the plurality of lower rotor blades and that is adjustable relative to the central mast.

32. The coaxial rotor system of claim 31, wherein the control system further comprises (i) at least one upper swashplate actuator that is operable to adjust the upper swashplate relative to the central mast and (ii) at least one lower swashplate actuator that is operable to adjust the lower swashplate relative to the central mast.

33. The coaxial rotor system of claim 30, wherein the central mast is configured to mountably receive a fairing.

34. The coaxial rotor system of claim 30, wherein wiring for the control system is routed from a power source at the helicopter and at least partially along the mast assembly to the control system, and wherein the wiring passes through the gearbox of the coaxial rotor system.

* * * * *